(12) United States Patent
Bailey et al.

(10) Patent No.: US 9,758,315 B2
(45) Date of Patent: Sep. 12, 2017

(54) FACILITY WIDE MIXED MAIL SORTING AND/OR SEQUENCING SYSTEM AND COMPONENTS AND METHODS THEREOF

(71) Applicant: LOCKHEED MARTIN CORPORATION, Bethesda, MD (US)

(72) Inventors: David Bailey, Vestal, NY (US); Wayne Blackwell, Chenango Forks, NY (US); Matthew Bossard, Montrose, PA (US); Michael Finney, Endicott, NY (US); Mark Gaug, Vestal, NY (US); John Hartman, Apalachin, NY (US); Jamie Micha, Binghamton, NY (US); William Olver, Binghamton, NY (US); Michael Riess, Endicott, NY (US); Gerald Sensenig, Vestal, NY (US); Clifford Solowiej, Apalachin, NY (US); Bruce Williams, Endwell, NY (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 154 days.

(21) Appl. No.: 14/642,826

(22) Filed: Mar. 10, 2015

(65) Prior Publication Data
US 2015/0224545 A1  Aug. 13, 2015

Related U.S. Application Data

(63) Continuation of application No. 13/909,782, filed on Jun. 4, 2013, now Pat. No. 9,020,634, which is a
(Continued)

(51) Int. Cl.
*B65G 47/46* (2006.01)
*B07C 5/00* (2006.01)
(Continued)

(52) U.S. Cl.
CPC ............ *B65G 47/46* (2013.01); *B07C 3/00* (2013.01); *B07C 5/00* (2013.01); *B07C 5/36* (2013.01);
(Continued)

(58) Field of Classification Search
CPC .... B07C 3/00; B07C 5/00; B07C 5/36; B65G 15/00; B65G 33/02; B65G 47/46; B65G 47/52
(Continued)

(56) References Cited

U.S. PATENT DOCUMENTS 4,388,994 A * 6/1983 Suda .................... B07C 3/02
209/564
4,615,446 A * 10/1986 Pavie .................... B07C 3/02
198/347.1
(Continued)

FOREIGN PATENT DOCUMENTS

WO   WO-03011484    2/2003
WO   WO-2006110484  10/2006

OTHER PUBLICATIONS

European Office Action for Application No. 08830359.9 dated Aug. 19, 2014; 3 Pages.
(Continued)

*Primary Examiner* — Leslie A Nicholson, III
(74) *Attorney, Agent, or Firm* — Kent E. Kemeny; Andrew M. Calderon; Roberts Mlotkowski Safran Cole & Calderon, P.C.

(57) ABSTRACT

The invention generally relates to a facility wide sorting and/or sequencing system for improving product processing operations and, more particularly, to a facility wide system and related functionality for simultaneously sorting and sequencing mixed mail pieces such as, for example, flats and letter mail pieces. The flats and letter mail pieces are placed
(Continued)

in frames so that all types of mail pieces can be sorted and/or sequenced simultaneously through merging and diverting a stream of filled trays into and out of different streams at a full or substantially full transport speed.

22 Claims, 29 Drawing Sheets

Related U.S. Application Data continuation of application No. 12/677,720, filed as application No. PCT/US2008/010715 on Sep. 12, 2008, now Pat. No. 8,457,781.

(60) Provisional application No. 60/960,050, filed on Sep. 13, 2007, provisional application No. 61/071,860, filed on May 22, 2008.

(51) Int. Cl.
*B07C 3/00* (2006.01)
*B07C 5/36* (2006.01)
*B65G 15/00* (2006.01)
*B65G 33/02* (2006.01)
*B65G 47/52* (2006.01)

(52) U.S. Cl.
CPC ............ *B65G 15/00* (2013.01); *B65G 33/02* (2013.01); *B65G 47/52* (2013.01); *Y10S 209/90* (2013.01)

(58) Field of Classification Search
USPC .............................. 198/348, 370.01; 209/900
See application file for complete search history.

(56) References Cited

U.S. PATENT DOCUMENTS

| | | | |
|---|---|---|---|
| 4,711,357 A * | 12/1987 | Langenbeck | B07C 5/362 198/367 |
| 5,551,543 A * | 9/1996 | Mattingly | B65G 13/10 198/370.01 |
| 5,833,076 A | 11/1998 | Harres et al. | |
| 5,857,830 A | 1/1999 | Harres et al. | |
| 5,947,468 A | 9/1999 | McKee et al. | |
| 5,993,132 A | 11/1999 | Harres et al. | |
| 6,026,967 A | 2/2000 | Isaacs et al. | |
| 6,135,697 A | 10/2000 | Isaacs et al. | |
| 6,183,191 B1 | 2/2001 | Mandie et al. | |
| 6,390,756 B1 | 5/2002 | Isaacs et al. | |
| 6,607,065 B2 * | 8/2003 | Peppel | B65G 47/766 198/367 |
| 7,124,876 B2 * | 10/2006 | Wolf | B65G 47/766 198/367 |
| 7,777,148 B2 * | 8/2010 | Zimmermann | B07C 3/06 209/583 |
| 7,928,336 B2 * | 4/2011 | Stemmle | B07C 3/08 198/803.7 |
| 7,971,701 B2 * | 7/2011 | Fourney | B65G 17/24 198/370.01 |
| 8,143,548 B2 | 3/2012 | Stemmle | |
| 8,552,327 B2 | 10/2013 | Pippin | |
| 8,731,707 B2 * | 5/2014 | Stemmle | B07C 3/082 198/350 |
| 8,766,128 B2 * | 7/2014 | Stemmle | B07C 3/00 209/584 |
| 8,796,577 B2 | 8/2014 | Harres et al. | |
| 9,415,422 B2 | 8/2016 | Worth, II et al. | |
| 2003/0038065 A1 | 2/2003 | Pippin et al. | |
| 2003/0168388 A1 | 9/2003 | Malatesta | |
| 2005/0230222 A1 | 10/2005 | Olson et al. | |
| 2005/0247606 A1 | 11/2005 | Redford et al. | |
| 2007/0056886 A1 | 3/2007 | Yui | |
| 2009/0000996 A1 | 1/2009 | Stemmle | |
| 2010/0049360 A1 | 2/2010 | Stemmle | |
| 2010/0070070 A1 | 3/2010 | Stemmle | |

OTHER PUBLICATIONS

Extended European Search Report for Application No. 08830359.9 dated Jun. 21, 2012.
Office Action in related U.S. Appl. No. 14/643,705 dated Feb. 7, 2017, 6 pages.
Notice of Allowance dated May 17, 2017 in related U.S. Appl. No. 14/643,705, 16 pages.

* cited by examiner

FACILITY WIDE MIXED MAIL SORTING AND/OR SEQUENCING SYSTEM AND COMPONENTS AND METHODS THEREOF

CROSS REFERENCE TO RELATED APPLICATIONS

The present application claims priority to U.S. Provisional Application No. 60/960,050 filed on Sep. 13, 2007, U.S. Provisional Application No. 61/071,860 filed on May 22, 2008, PCT application no. PCT/US08/010715 filed on May 22, 2008, U.S. application Ser. No. 12/677,720 (now U.S. Pat. No. 8,457,781) filed on Sep. 12, 2008, and U.S. application Ser. No. 13/909,782 filed on Jun. 4, 2013, the disclosures of which are incorporated by reference in their entireties herein.

DESCRIPTION

Field of the Invention

The invention generally relates to a facility wide sorting and sequencing system for improving product processing operations and, more particularly, to a facility wide system and related functionality for simultaneously sorting and sequencing mixed mail pieces such as, for example, flats and letter mail pieces.

Background Description

The sorting of mail is a very complex, time consuming task. In general, the sorting of mail is processed through many stages, including front end and back end processes, which sort and sequence the mail in delivery order sequence. These processes can either be manual or automated, depending on the mail sorting facility or the type of mail to be sorted such as packages, flats, letter and the like. A host of other factors may also contribute to the automation of the mail sorting, from budgetary concerns to modernization initiatives to access to appropriate technologies to a host of other factors.

SUMMARY OF THE INVENTION

By way of non-limiting examples, the following is a list of acronyms that may be used in the instant application. This list should not be considered exhaustive of all acronyms used herein, and is provided merely for reference and convenience. These acronyms may also be defined within the instant application.

| Acronym | Description |
| --- | --- |
| AFCS | Advanced Facer Canceller System |
| AFSM 100 | Automated Flat Sorting Machine 100 |
| APPS | Automated Package Processing System |
| AMC | Airport Mail Center |
| AO | Associate Office |
| API | Application Programming Interface |
| ATHS | Automatic Tray Handling System |
| BCR | Bar Code Reader |
| BMC | Bulk Mail Center |
| BODS | Barracuda Operational Data Store |
| CIOSS | Combined Input/Output Subsystem |
| CPU | Central Processing Unit |
| DBA | Database Administrator |
| DBCS | Delivery Bar Code Sorter |
| DBCS-OSS | Delivery Bar Code Sorter/Output Subsystem |
| DIOSS | Delivery Bar Code Sorter Input/Output Subsystem |
| DPS | Delivery Point Sequencing |
| DU | Delivery Unit |
| EFFS | External File Format Specification |
| EOR | End of Run |
| FCM | First Class Mail |
| FICS | Flats Identification Code Sort |
| FIFO | First In First Out |
| FIM | Facing Identification Mark is a bar code designed by the United States Postal Service to assist in the automated processing of mail. In embodiments, FIM can be a set of vertical bars printed on the mail pieces. FIM is intended for use primarily on preprinted mail pieces printed by a sender. |
| FRU | Field Replaceable Unit |
| FSM | Flat Sorting Machine |
| FSS | Flat Sequence System |
| GPS | Global Positioning System |
| GUI | Graphical User Interface |
| HMI | Human Machine Interface |
| HTTP | Hypertext Transfer Protocol |
| ICD | Interface Control Document |
| ID | Identification |
| IDS | Integrated Data System |
| JDBC | Java Database Connectivity |
| LAN | Local Area Network |
| MPE | Mail Processing Equipment |
| MTE | Mail Transport Equipment |
| NDSS | National Directory Support System |
| OCR | Optical Character Reader |
| ODBC | Open Database Connectivity |
| PICS | Postal Identification Code Sort |
| PMPC | Priority Mail Processing Center |
| P&DC | Processing and Distribution Center |
| P&DF | Processing and Distribution Facility |
| RBCS | Remote Bar Coding System |
| RCR | Remote Computer Reader |
| RDBMS | Relational Database Management System |
| REC | Remote Encoding Center |
| RMA | Reliability, Maintainability, Availability |
| SAD | System Architecture Document |
| SOP | System Operating Procedure |
| SQL | Sequential Query Language |
| SSS | System/Subsystem Specification |
| TCP/IP | Transmission Control Protocol/Internet Protocol |
| TPM | Technical Performance Measurement |
| UFSM | Upgraded Flat Sorting Machine |
| URS | Universal Recognition System |
| USPS | United States Postal Service |
| ZIP | Zone Improvement Program |

BRIEF DESCRIPTION OF THE DRAWINGS

The present invention is described in the detailed description which follows, in reference to the noted plurality of drawings by way of non-limiting examples of exemplary embodiments of the present invention.

FIG. 2I(B) shows a four lead screw conveyance system, as further described with respect to FIG. 2W and FIG. 2X, in accordance with aspects of the invention.

DETAILED DESCRIPTION OF EMBODIMENTS OF THE INVENTION

Figure 1:
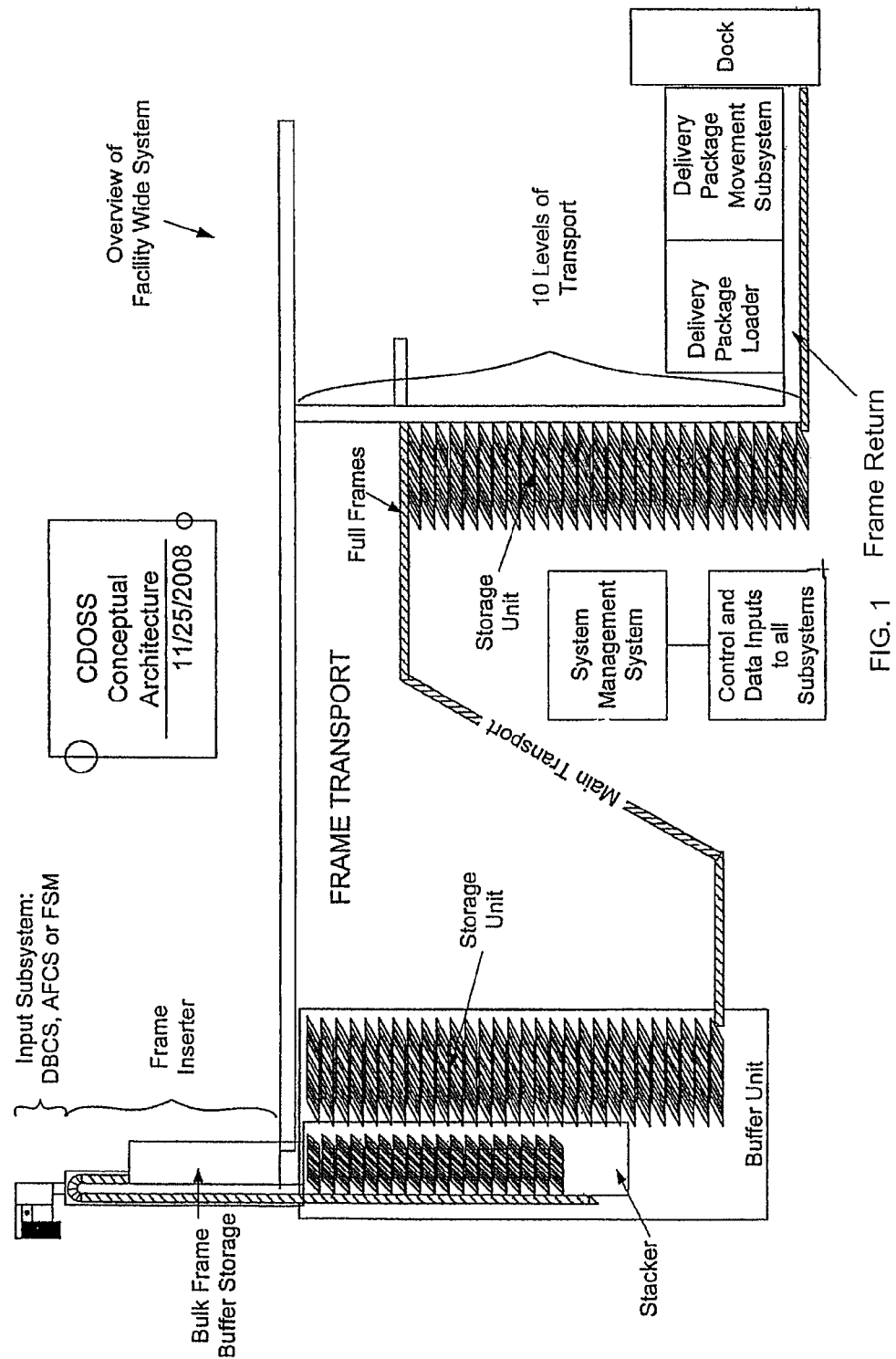
FIG. 1 shows an exemplary overview of a system architecture in accordance with aspects of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Overview of System

The invention generally relates to improving product processing operations and, more particularly, to a method and system of sorting and/or sequencing letter mail, flats and parcels and other objects. The system and method can be implemented in a warehouse, or mail sorting or any type of sorting facility. Implementing the present invention allows for the continuous sorting of mail pieces to any level of sortation using a single pass. To accomplish the advantages of the invention, the system and method uses multiple stages of diverts and merges, e.g., individual mail pieces are diverted into a sortation system composed of multiple stages each with many parallel paths. The mail pieces are merged and combined into sequenced order at the conclusion of sorting. Moreover, in accordance with aspects of the invention, the mail pieces are sorted and/or sequenced in a stacked configuration, e.g., face-to-face (i.e., not end-to-end), in frames thus resulting in high throughput at low conveyor speeds. The present invention also relates to controls and methods for processing mail pieces throughout a facility and provides a seamless integration of computing functionality, e.g., sorting and sequencing methodologies, controls, etc., as further discussed below. The present invention represents a quantum leap over current mail sortation and sequencing operations.

More specifically, with the present invention, a facility-wide sorting and/or sequencing system incorporates the sorting and/or sequencing of flat mail, letter mail and, in embodiments, small parcels in a one pass stream. In embodiments, flat mail, letter mail and, in embodiments, small parcels, are placed into frames which are transported in a face-to-face orientation, which significantly increases throughput while potentially decreasing the footprint of the facility wide machine. The facility wide system includes input feeders, where mail pieces are singulated, the mail piece address and/or bar codes are recognized, and the mail pieces are transported individually into the induction and sequencing portions of the system. The input feeders, in embodiments, can be conventional flat and letter feeders which are integrated into the system of the present invention. The system further includes a mail frame induction system, where the mail pieces are matched with a frame, inducted into the frames, and transported and merged into a sequence or certain sort depth using a diverting and merging methodology as discussed in further detail below. Throughout the system, the frames can be managed by controls, e.g., compressed and or expanded, merged, diverted, sorted and/or sequenced, and shuttled throughout subcomponents in an efficient and cost effective manner. Once the combined mail pieces are in a sequence or a certain sort depth, the mail pieces are extracted from the frames using a mail piece extraction subsystem. Advantageously, the frames and mail pieces can be transported in groups through various stages, e.g., between many different subsystems, using transports such as, for example, shuttles. The shuttles allow the frames and mail pieces to move quickly and efficiently throughout the facility.

Also, the system of the present invention is modular, which allows it to be expanded depending on the needs of a particular facility. The modularity of the system of the present invention also allows the system to be used with current machinery such that sorting and sequencing processes can continue without any significant interruption during the assembly of the facility wide system. Additionally, as discussed in more detail below, the system and method of the present invention includes unique sorting and/or sequencing schemes, transport systems, e.g., lead screws, right angle diverts, etc., as well as computing functions, storage facilities, and preventive detection of maintenance issues. In addition, the present invention contemplates the use of certain architectures, facility and postal wide schemes, methodologies and systems that result in great savings to the postal system and increased efficiency of sorting and/or sequencing and floor space.

More particularly, the present invention includes, in addition to other systems, components, etc, a facility wide mail sortation and/or sequencing system having the following functionality, components, etc. as shown in FIG. 1. It should be noted that FIG. 1 is representative of a general overview of the system and, as such, additional features, capabilities, functions, etc. are contemplated by the present invention as described throughout the instant application.

Input Devices

The input devices are a series (1 to many) of mail piece feeders such as, for example, letter feeders, flat feeders and parcel feeders. These input devices comprise a barcode or address scanner, an algorithm that calculates the output bin associated with the input mail piece, a mechanical interface to convey mail from the output into the facility wide system, and a computing interface to communicate the associated address information to the remaining portions of the system. The bar code sorter may also communicate other information associated with a mail piece including mail image(s), indicia image(s) or characteristics, dimensions, barcodes, weights, sorter identification, and sortation information. More specifically, information that may be received, tracked and communicated throughout the system includes, for example, the following mail piece information from each induction subsystem:

Length;
Width;
Height;
Volume;
Orientation;
Overall Length;
Overall Width;
Transverse Position;
Barcode Information on the mail piece;
Address information returned form the Address & Attribute Recognition System (AARS);
Weight;
Location; and
Mail type.

Facility Wide Sorting and/or Sequencing System

The Facility Wide Sorting System includes many subsystems such as, for example, mail frame inductors to induct many different types of mail pieces, e.g., letters, flats, small parcels, into frames for transportation throughout the system; right angle diverts and merging points to sort and sequence mail pieces in the frames, shuttles for transporting the frames between subsystems and components, mail frame extractors and controls such as, for example, management systems for controlling the functions of the system, e.g., sorting and sequencing processes. The system further includes inter and intra facility components and networks and related functions and visibilities, as discussed herein. Some systems include, as an example, an identification subsystem that takes input data from the input devices and associates one or more electronic identifier uniquely to each mail piece. These electronic identifiers are used to track mail piece and to associate all related data to the mail piece.

Storage Subsystem

The storage subsystem is capable of storing mail between the receipt of mail to the dispatch of it. The storage system may be modular in nature, to be able to be sized to handle the volume of mail pieces from many different sizes of facilities. The association of a unique identification of the mail determines storage operations with its position in the system.

Input Subsystem

The Input Subsystem includes the Delivery Bar Code Sorters (DBCS) and the Flat Sorter Machines (FSM). In some embodiments, to take advantage of current USPS investments, the system of the invention uses the input sections (including induction stations, singulation, Optical Character recognition, barcode assignment, and facing canceling) of existing sortation systems. The portions of these systems used are the singulation, address/barcode assigning/reading/interpretation of the units.

Frame Inserter

The Frame Inserter places individual mail pieces into frames. It is assumed that mail piece frames will come in many different sizes. The inserter or its computing subsystem will choose the proper size of mail frame and insert the mail inside by using, e.g., optical recognition technology, photodiodes, or other known technologies all of which are capable of being implemented by one of skill in the art. In embodiments, the inserter shall be capable of inserting flat and letter mail at the rate of about 35,000 mail pieces per hour. In embodiments, the inserter can be a rotary inserter. By way of example, the rotary inserters include two pinch belts. As the mail passes between the pinch belts, it will be inserted within the frames as they are automatically expanded about a radius of the frame. (The frames open as they revolve around a carousel.) The rotary inserter, in embodiments, has the capability of about 35,000 insertions per hour. In implementation, it is contemplated that there would be one inserter for every DBCS or every two FSM machines.

Frames

The frames are designed to hold mail pieces. Although many different sizes of frames are contemplated by the present invention, two specific sizes of frames can include one full-height (which can contain any size mail piece) and one half-height that shall convey mail pieces smaller than 6 inches tall. Frames are capable of being measured for minimal thickness necessary for diversion. A frame maximum thickness when stacked empty can be less than 0.1 inch. Also, frames containing mail pieces of less than or equal to 0.1 thickness can store the resulting mail pieces on ⅛ inch centers. The frames can be configured and structured to be closed (sealed to prevent mail piece from escaping during sortation and transportation) at the end of insertion operations. In still further embodiments, the frames should be able to be stored in variably spaced storage units (only occupy the thickness of the mail piece). Also, the frames are designed such that they are able to be stored, diverted, retrieved and conveyed during normal truck transportation vibration at full conveyor speed. Also, the frames are conveyed and diverted with only the drive power from the conveyor, e.g., transportation system.

Buffer Subsystem

In certain embodiments, the Buffer Subsystem assures that surges in mail input do not result in overstressing the transport and assures that mail pieces get routed to the proper transport layer.

Transport Subsystem

The Transport Subsystem includes the numerous conveyors that transport the mail frames internally through the system. The transports carry the frames from the inserters throughout the system. In embodiments, the transport can handle about 80,000 mail pieces per hour (or 800,000 per hour for the main trunk). Transports include straight, curved, and ramped conveyors preferably of a lead screw type. The transport, in one embodiment, may be stacked layers.

Storage Subsystem

The Storage Subsystem automatically stores and retrieves mail pieces (in frames). This system can include buffers or storage areas for shuttles, which are designed to hold the frames during transport between different components.

Delivery Container Loader

The Delivery Container Loader packs the mail pieces into Delivery Containers. In embodiments, the loader resembles a conveyor other than the walls are a series of delivery containers. The containers are loaded at the speed of the conveyor. There is a small buffer to allow switching between full and empty containers. In embodiments, the following is noted.

- The delivery container loader is configured to not require additional packaging machinery (like lidders/banders) to make the packages ready for delivery.
- The delivery container loader is configured to automatically load an empty container when a previous container is full.
- The delivery container loader is configured to at least operate 10 minutes without requiring manual intervention including adding new packages, or removing full packages.

System Management Subsystem

The System Management Subsystem controls and coordinates all system operations and maintains the identity of all mail pieces and/or frames. The system management subsystem is the series of computers that control and schedule all system movements, keep track of all mail piece identification by position, interface with human operators, and that interface all information between subsystems. The system management subsystem can include known algorithms to sort/sequence the mail (in the frames), as well as controls to control the ejection of the mail from the frames, the stacking thereof, etc.

Delivery Container Movement Subsystem

The Delivery Container Movement Subsystem moves the Delivery Containers from the loader to the point of delivery (dock). This system can include specially designed carts that may be nestable as discussed in the instant application.

The system of the present invention should have as small a space footprint as possible. The footprint includes all major components and working areas for personnel associated with the equipment. As such, the components are designed to be located within existing USPS processing and delivery facilities. In addition, it is contemplated that the throughput of the sorting and/or sequencing is significantly increased compared to conventional systems, e.g., upwards of 80,000 frames or more per hour. Additionally, and advantageously, the system is designed to handle all types of mail, simultaneously, while still using some existing sortation equipment such as, for example, letter, flat and parcel input feeders.

Additional Systems and Components

Although not specifically shown, the system can also include additional components and systems such as, for example, an unpackaging subsystem, Dispatch Packaging system, Receipt Packaging system, and Input Multiplexing subsystem. More specifically, the Unpackaging subsystem removes mail pieces from the standard mail packages and puts the resultant mail into tubs or containers, directly into transportation vehicles, or delivery point packaging. The Dispatch Packaging system packages standard mail packages into containers for shipping to the processing facilities without removing the individual mail piece container. The Dispatch Packaging system also packages standard mail packages into shipping containers, rolling stock or directly into transportation vehicles to other processing facilities without removing the individual mail piece container. The Receipt Packaging system unpacks standard mail packages from shipping containers, rolling stock, or directly for transportation vehicles from other processing facilities without removing the individual mail piece container. The Input Multiplexing subsystem takes mail from many different input devices and delivers them to the many modular storage and sortation subsystems, described herein. This subsystem associates a mail unique identification with its position in the system. Multiplexing operations are determined by this association.

System Environment

Figure 1A:
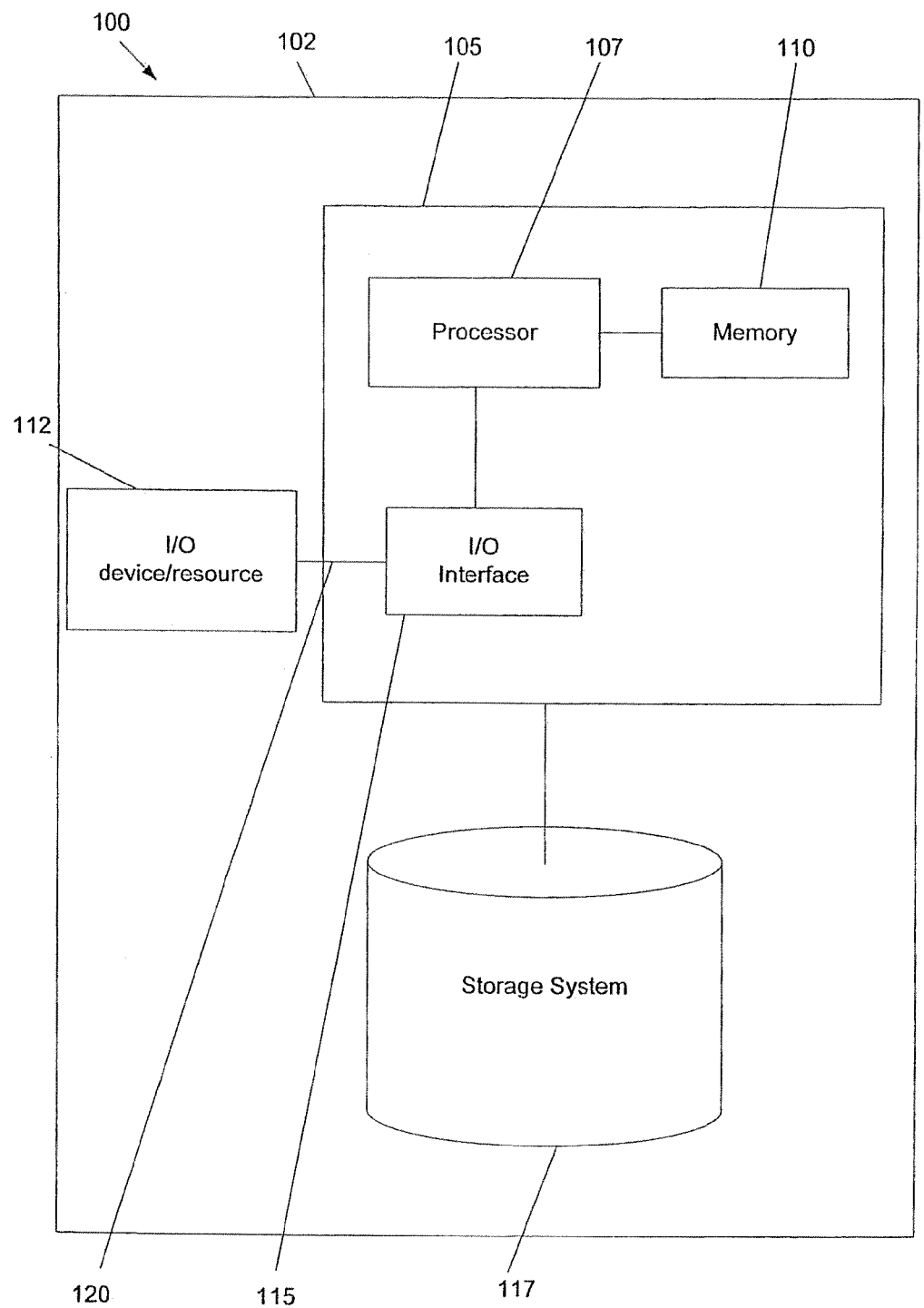
FIG. 1A shows an exemplary computer system environment for implementing a facility-wide mail sorting and/or sequencing system in accordance with aspects of the invention.

FIG. 1A shows an exemplary computer system environment 100 for implementing a facility wide mail sorting and/or sequencing system in accordance with the invention. As shown in FIG. 1A, the exemplary computer system environment 100 includes a computer infrastructure 102 that is operable to perform the processes described herein using a computing device 105. The computer infrastructure 102 can be, for example, one or more servers that are accessible by different computing devices throughout the facility or remotely from the facility.

The computing device 105 includes a processor 107, a memory 110, an input/output (I/O) interface 115, and a bus 120. The bus 120 provides a communications link between each of the components in the computing device 105. The communications link may be a wire or wireless link such as, for example, a LAN, WAN, intranet or the Internet. Additionally, the computer system environment 100 includes a storage system 117, e.g., database. While only a single storage system 117 is shown, it should be understood that the computer infrastructure 102 may include any number of storage systems 117. Moreover, it should be understood that, in embodiments, the storage system 117 may include one or more local storage systems implemented throughout the facility wide system and/or one or more remote storage systems. For example, the one or more storage systems 117 can be utilized to store information such as, for example, sorting and/or sequencing schemes, allocation plan, mail piece position within the facility, dock management information, control of different subcomponents, frame and mail piece size, identification and other attribute information, frame manifest, system wide functions, maintenance information, etc, as discussed in further detail below.

The processor 107 executes computer program code processes on computer storage media, which may be stored in the memory 110 and/or storage system 117. The computer storage media may be, for example, a magnetic or optical portable disk, a hard drive, random access memory (RAM), read-only memory (ROM), an erasable programmable read-only memory, etc. to name a few. While executing computer program code, the processor 107 can read and/or write data to/from the memory 110, storage system 117, and/or I/O interface 115. The memory 110 may include, for example, local memory employed during actual execution of program code, bulk storage, and/or cache memories which provide temporary storage of at least some program code to reduce the number of times code must be retrieved from bulk storage during execution.

Further, the computing device 105 is in communication with an external I/O device/resource 112. The I/O device 112 can interact with the computing device 105. In embodiments, the external I/O device/resource 112 may be, for example, a keyboard, one or more interfaces, one or more pointing devices, etc.

Thus, for example, as described herein further below, the computer infrastructure 102 may include one or more computing devices, e.g., for each processing and delivery center (P&DC) or for each regional command center. Moreover, in embodiments, the computer infrastructure 102 may be provided for each regional command center, wherein the computer infrastructure 102 of each regional command center is in communication with the other computer infrastructures 102 of the other regional command centers of the system-wide mail sorting and/or sequencing system.

Transportation and Conveying of Containerized Mailpieces

The present invention is directed to a conveyance or transport system designed and structured to transport frames in a sorting and/or sequencing system. The frames can be filled with mail pieces of different sizes, shapes and types, such as, for example, flats and letters. The present invention is also directed to a method of controlling and coordinating the movement of a high volume of mail pieces held within individual frames through the system for efficient sorting and/or sequencing. The present invention also provides related mechanisms to sense, monitor, and control, e.g., divert, high volumes of individual frames independently of other frames along a given conveyance path within the conveyance system. The system of the present invention provides advantages over known systems in that it is now possible to sort and/or sequence different types of object types or mail pieces, i.e., letters, flats, parcels, etc. effectively and efficiently in a single facility-wide letters/flats mail sorting and/or sequencing system.

In embodiments, conveyance mechanisms are configured to transport the frames through the system at a canted angle of about 45 degrees (with relation to the stream of travel) and in a front-to-back orientation (as compared to a lengthwise orientation). This orientation allows for a dense and efficient way to transport the frames in volume, and allows the frames to efficiently be diverted along different paths, e.g., at right angles, without slowing the speed of transport. Also, as the mail pieces are in a front-to-back orientation, more mail pieces can be carried on the conveyance mechanism in less amount of floor space, in a faster manner than conventional lengthwise conveyances. That is, angling the frames at 45 degrees allows for more efficient transporting and diverting of the frames in less space from one conveyance path to another. The conveyance mechanisms may be, but are not limited to, lead screw mechanisms, tooth belt mechanisms, pinch belt mechanisms, individual roller mechanisms, chain mechanisms or any combination of the different conveyance mechanisms.

In various embodiments, as described below, mail pieces in frames are sorted and sequenced using right angle diverts (RADs), merges, compression zones, decompression zones, and shuttles. For example, RADs split a stream of frames into different streams, e.g., at right angles, by diverting individual frames. Due to the 45 degree angle orientation of the frames through the system, RADs can divert the frames without stopping either stream by sliding them from between adjacent frames. Merges merge two streams of frames into a single stream, again using RADS. Again, due to the 45 degree orientation angle, two streams of frames can be merged without stoppage. Compression zones remove gaps from between frames within a stream and decompression zones insert gaps between frames within a stream. When individual handling of frames is not required, frames are moved as batches contained in shuttles. After mail pieces have been sorted and sequenced, they are extracted from the frames and inserted into trays for delivery. The process of extracting mail pieces from frames is referred to as "extraction".

In embodiments, the conveyance mechanisms transport the frames forward, backward, up, down, or divert the frames from one conveyance path to another provided throughout the sorting and/or sequencing system. In an aspect of the present invention, the conveyance mechanisms also allow the frames to be compressed or decompressed for more efficient movement of sorted (and/or sequenced) frames through the sorting and sequencing system. More specifically, e.g., the compression zone mechanisms are structured to compress frames closer together as they move throughout the system, thereby increasing overall usable space on the conveyance mechanisms.

In embodiments, movement (e.g., diversion and compression) of the frames is controlled by a control unit (i.e., also known as a Frame Routing Agent) which coordinates the movements of individual frames using real-time location notifications from a plurality of sensors communicating with the control unit. In other words, best-path routing of the frames through the sorting and sequencing system is determined by a series of request and response messages between the plurality of sensors and the control unit monitoring each individual frame as discussed in the instant invention.

Based on the foregoing, the present invention provides a conveyance system for efficiently and reliably transporting a high volume of individual frames carrying mail pieces through a sorting and/or sequencing system in less space. It is also contemplated that the present invention may be implemented in any type of postal service or company mail center that needs to presort, sort or sequence mail pieces.

Right Angle Diverts

In sorting millions of mail pieces a day, mail pieces are conveyed at high rates from many inputs (e.g., a conveyance path) and may be selectively diverted to one of many outputs (e.g., branched conveyance paths). Effective diversion (i.e., re-routing) of an individual frame (carrying a mail piece) from one conveyance path to another, as provided by the present invention, does not affect the position or velocity of a neighboring frame on either conveyance path, does not require space on the path (in addition to its own dimensions), and does not require either conveyance path to slow or stop the frames to accomplish the diversion.

Figure 2A:
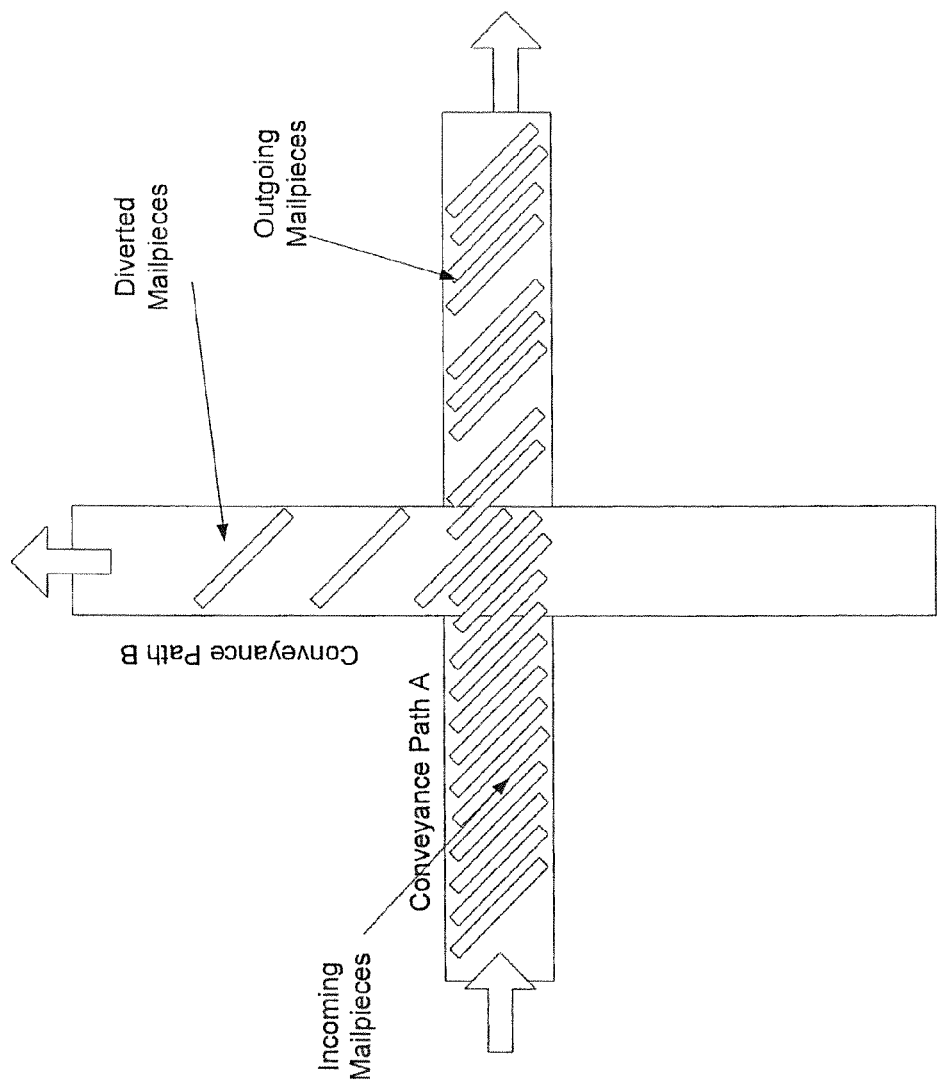
FIG. 2A shows a schematic of a non-limiting embodiment of a right angle divert in accordance with aspects of the invention.
Figure 2B:
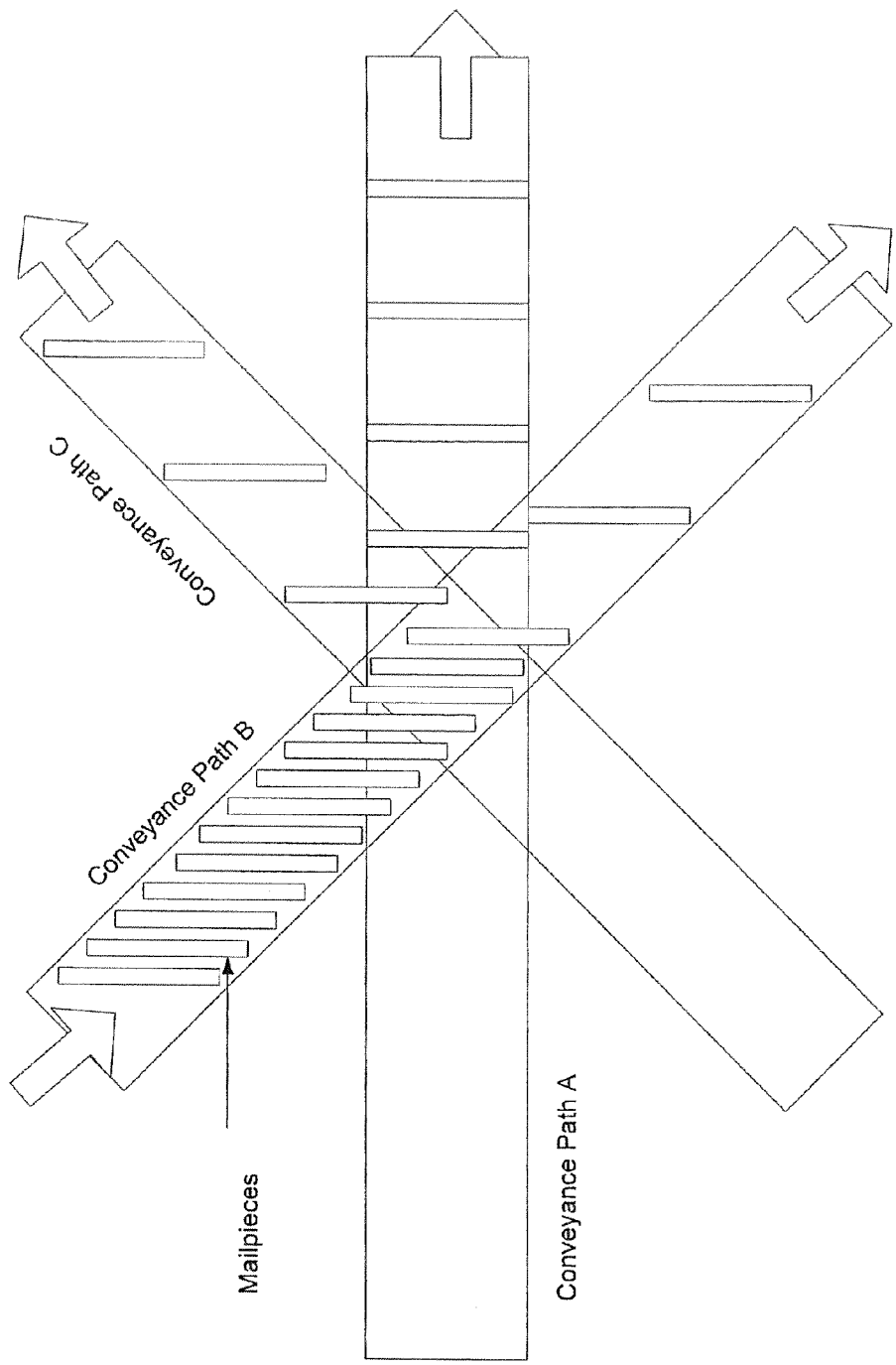
FIG. 2B shows a schematic of another non-limiting embodiment of a right angle divert in accordance with aspects of the invention.
Figure 2C:
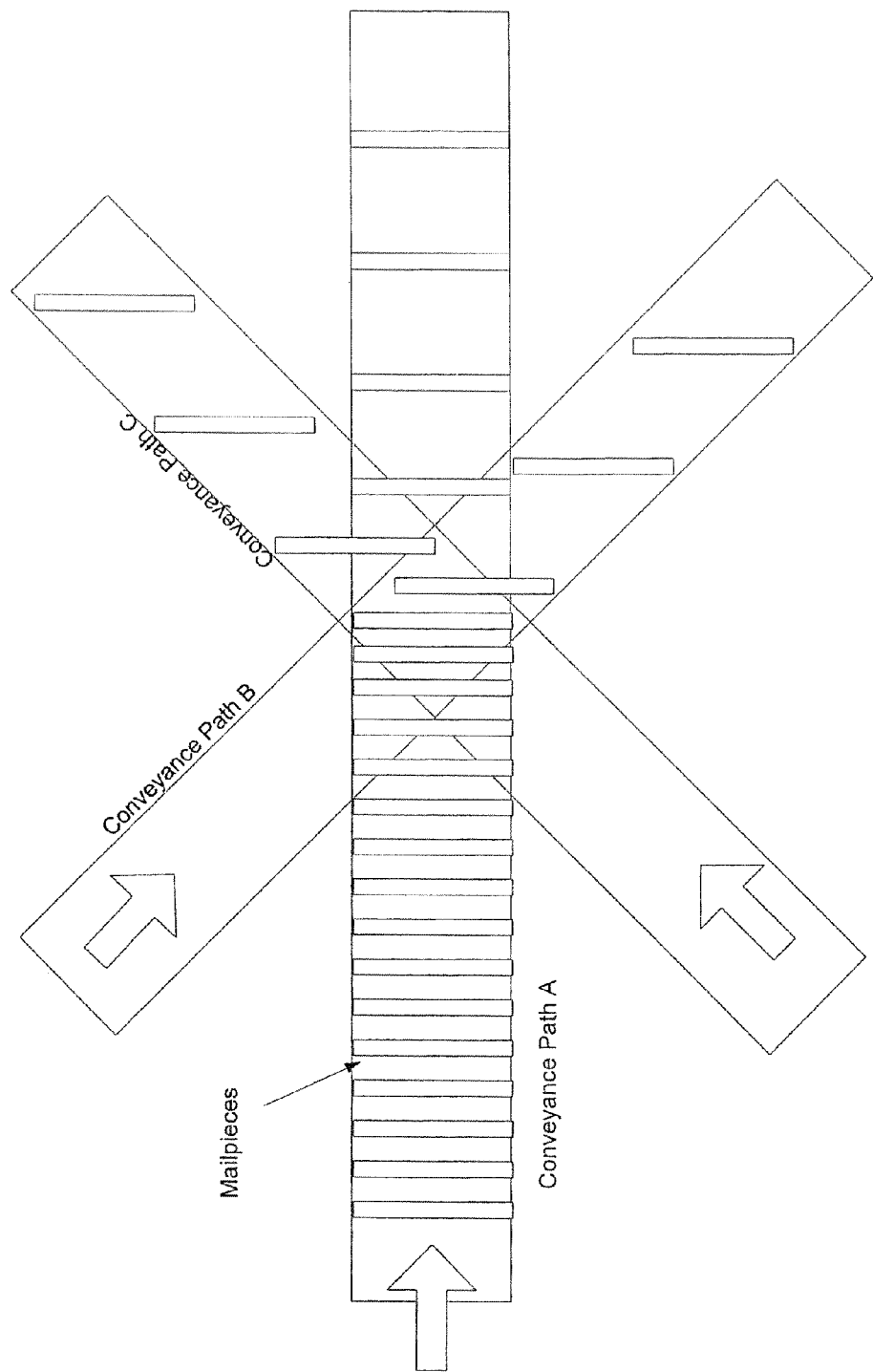
FIG. 2C shows a schematic of yet another non-limiting embodiment of a right angle divert in accordance with aspects of the invention.

In this regard, FIG. 2A-FIG. 2C generally show various right angle diverts along the conveyance system in accordance with aspects of the present invention. For example, as shown in FIGS. 2A and 2C, initially frames having a leading edge and a trailing edge are conveyed along the (linear) conveyance path "A" at a 45 degree angle with respect to direction of travel. In the example of FIG. 2B, the initial conveyance path is conveyance path "B". Referring specifically to FIG. 2A, at a point of diversion (where the input conveyance path "A" converges with conveyance path "B", e.g., at a location where the frame intersect with an output conveyance path "B"), the frame's forward motion is redirected at a right angle down the output conveyance path "B" starting at its trailing edge.

In the example of FIG. 2B, interestingly, the frames can be diverted from conveyance path "B" to either of conveyance path "A" or "C", depending on the sorting scheme. In the example of FIG. 2C, interestingly, the frames can be diverted from conveyance path "A" to either of conveyance path "B" or "C", depending on the sorting scheme. In both of the examples of FIGS. 2B and 2C, the frames will remain in a 45 degree angle when transported to a conveyance path that is at a right angle; whereas, the frames will be reoriented onto the output conveyance paths when they are not at a right angle. However, in any scenario, the frames will remain in a front-to-back orientation. That is, the frames (and their respective mail pieces) are oriented such that the front of one mail piece is laterally stacked (at the 45 degree angle) next to the back of a neighboring mail piece, thereby enabling mail pieces to easily move from one conveyance path to another.

In any of the embodiments shown in FIGS. 2A-2C, the frame transitions from the input conveyance path to the output conveyance path without slowing conveyance path speed and without disturbing any adjacent frames. That is, the frames can be merged into streams and removed from streams at full transport speed, without interruption to the processing. In embodiments to accomplish this advantage, forward motion of the leading edge of the frame stops at the point of diversion and the trailing edge of the frame initiates the diversion to the output conveyance path (i.e., the trailing edge becomes the leading edge down the diversion pathway).

Additionally, the following is contemplated by the present invention:
  The conveyance paths operate at a fixed speed;
  A diversion operation performs at a set input speed of the input conveyance path;
  Since all conveyance paths operate at the fixed speed, it is possible to reduce the number of required conveyance motors, thus eliminating the need for each frame or mail piece (slot) to have an independent motor (such as implemented in some existing diversion technologies);
  Since mail pieces are stacked front-to-back, throughput limitations of conveying mail pieces end-to-end is eliminated;
  Divert mechanisms may act like filters. That is, divert mechanisms may be controlled to intentionally divert certain mail pieces on to a path based on a sorting or sequencing algorithm;
  Although up to three divert paths are shown in FIG. 2A-2C, more divert paths at other angles are also contemplated by the present invention;
  Mail pieces do not need to originate on a path that has them at 90 degrees to the output conveyance path (see e.g., FIG. 2A). An example of this is shown in FIG. 2B and FIG. 2C; and
  The diversion operations may be reversed. That is, as long as there is an opening for a frame available, multiple paths can be combined into a single stream.

Figure 2D:
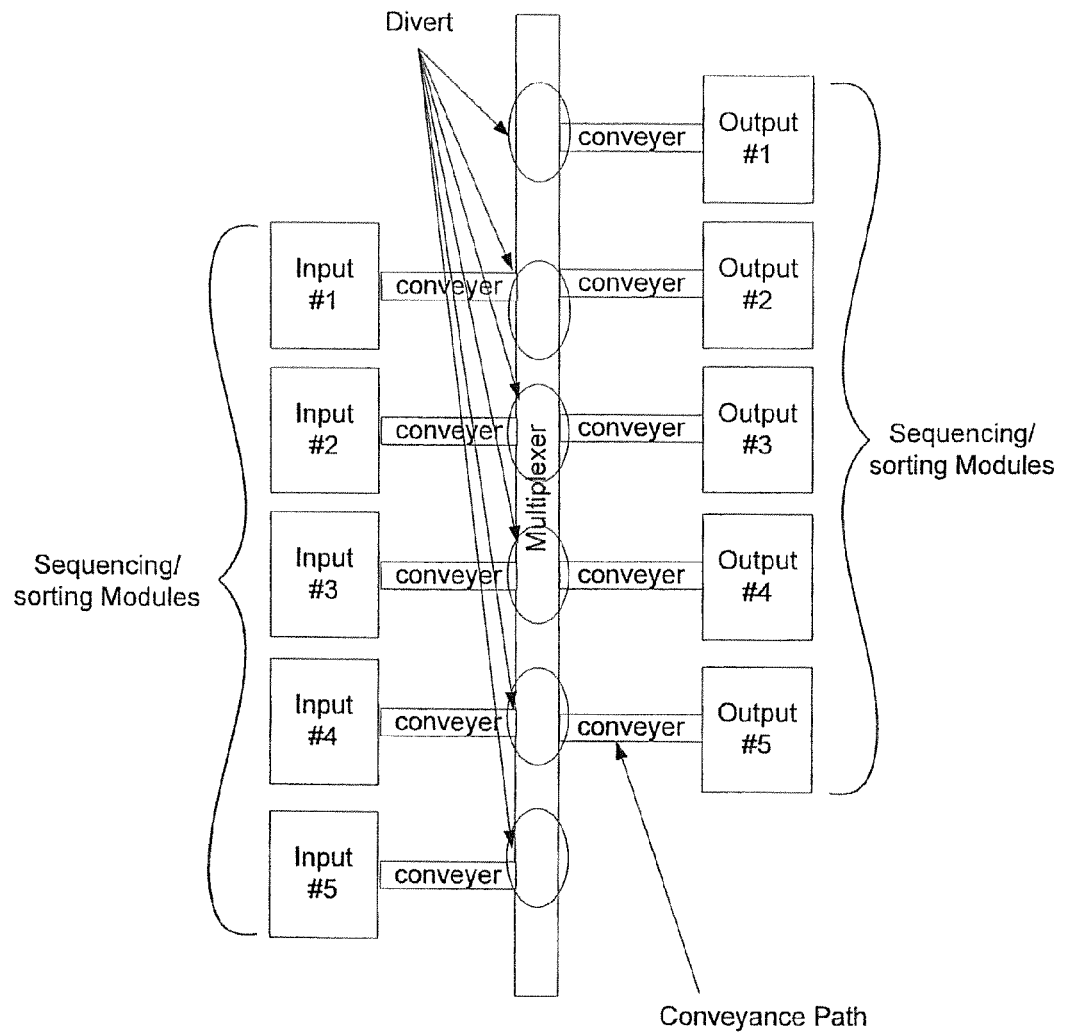
FIG. 2D shows a schematic of a non-limiting embodiment of a multiplexer in accordance with aspects of the invention.

Diverts may be implemented in a variety of machines within the mail sorting and/or sequencing system. For example, diverts may form the basis for a mail stream multiplexer as shown in FIG. 2D. In particular, the multiplexer is located between sections of large sorting and/or sequencing machines which are capable of routing mail pieces (frames) from one of many input conveyance paths to one of many output conveyance paths. The multiplexer may, for example, route mail pieces to paths that will process, store, package, unpackage, and deliver the mail pieces to their appropriate destinations within the mail sorting and/or sequencing system.

Figure 2E:
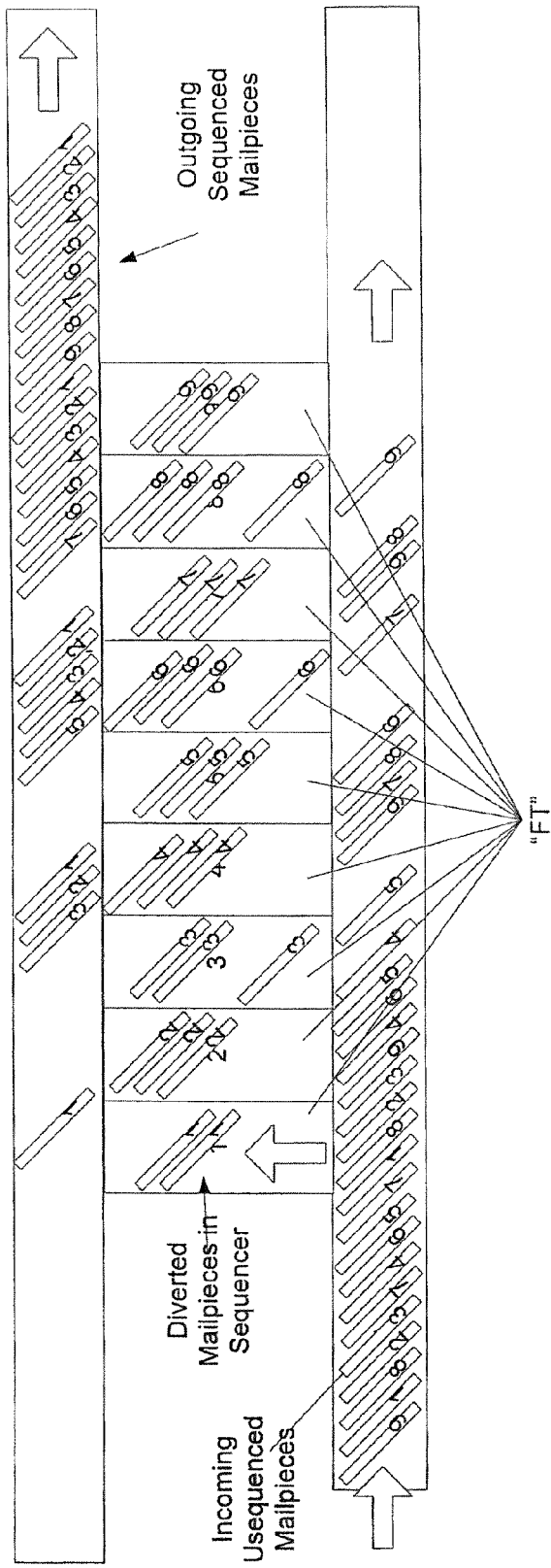
FIG. 2E shows a schematic of a non-limiting embodiment of a mail section sequencer in accordance with aspects of the invention.

By way of further example, diverts may also be implemented in a mail sorter and/or sequencer, itself. As shown in FIG. 2E, frames can be streamed through an input conveyance path in an unsequenced order and divided into a plurality of divert paths (or "sections") corresponding to the number of diverts associated with the sequencer (e.g., nine diverts). As the frames are streamed to the different divert sections, a sorting process can begin. For example, in the example of FIG. 2E, each frame is designated with a number from 1 to 9, as there are nine different diverts. Numbers 1-9 also represent the order of each mail piece in the group of nine. These incoming unsequenced mail pieces are diverted into the sorting "aisles" based on that sequence number. The sequence number only refers to the position within that group of 9 (and does not have any relation to the position of letters in other groups). In this example, all mail frames designated with "1" will be diverted to the first divert, all mail pieces designated with a "2" will be diverted to a second divert, and so on. In this way, each divert will handle a certain designated mail frame. As the frames are diverted to the outgoing transport, they are placed in a numerical order, e.g., 1, 2, 3, 4, 5, 6, 7, 8, 9. This numerical order can be a first sorting of the mail pieces. In this way, the frames (mail pieces) can begin the process in a random order and end a first segment of the process in a numerical order indicative of a first level type sort. The sequence itself, as should be understood by those of skill in the art, may be a configurable algorithm that corresponds to a mail piece destination, a delivery sequence, a mail carrier preference, or other criteria. It should be noted that the numbers in FIG. 2E show a mail sequence of mail pieces relative to other mail pieces in the same "section" for illustrative purposes. For example, a number 5 mail piece in one "section" of mail has no relationship to the sequence of a number 5 mail piece in another "section" of mail.

It should further be noted that each mail piece includes a designated sequencing number and each frame transport "FT" includes a frame transport number. As shown, as each individual mail piece arrives at its designated frame transport "FT", the RAD diverts the mail piece into the designated frame transport "FT".

As further shown in FIG. 2E, the mail pieces travel along their respective frame transports "FT" (also referred to as frame transport tubes) are merged via a respective RAD (not labeled) onto the outgoing path or main branch. Moreover, as can be observed in FIG. 2E, upon being diverted to the main branch, the mail pieces are in a sequenced order with relation to one another. This may be considered a first stage of sorting and/or sequencing. For example, mail pieces are numbered 1-9, which is representative of nine diverts (frame transports FT). In embodiments, these numbers do not represent mail addresses, ZIP codes, etc. but are numbers relating to the number of transports FT. Each respective numbered mail piece will be diverted to its respective frame transport FT, e.g., mail pieces numbered 1 will be transported to a transport 1, etc. As the mail pieces exit each of the frame transports FT, they will be placed in a sequence, e.g., 1-9 for further processing. So, in the example shown in FIG. 2E there are a plurality of groups of mail pieces in a sequence 1-9.

Figure 2F:
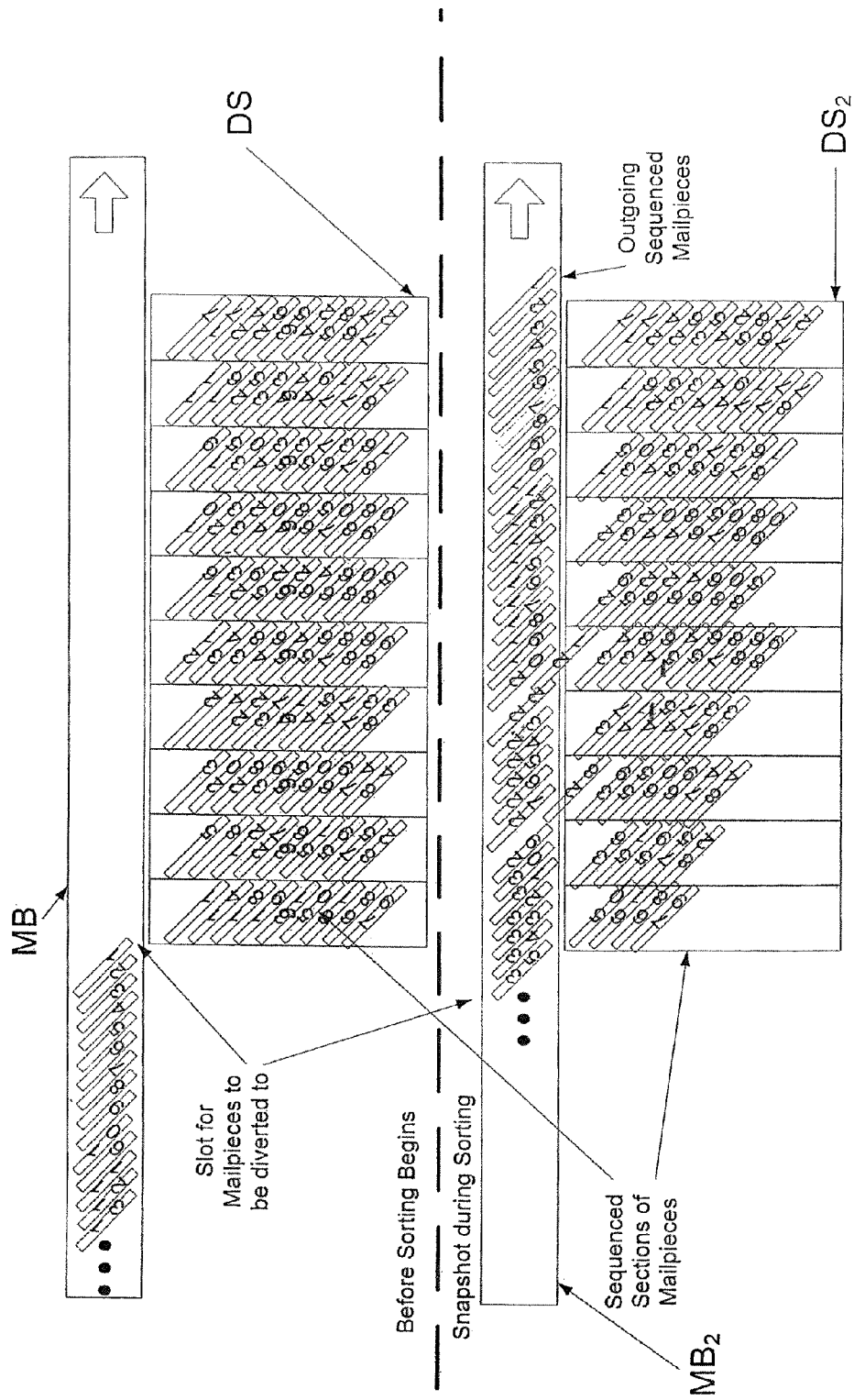
FIG. 2F shows a schematic of a non-limiting embodiment of a mail sequencer in accordance with aspects of the invention.

Similarly, diverts may further be implemented in cascading sections of a mail sorting and/or sequencing system. FIG. 2F illustrates how smaller batches of mail pieces which are themselves in relative sequenced order may be grouped together to form larger batches of sequenced mail pieces, in accordance with aspects of the present invention. In this exemplary embodiment, upon being merged, the mail pieces are within groups of nine, as there were nine frame transport tubes in the first stage of sequencing.

As further shown in FIG. 2F, the output of the first stage is cascaded to a second stage. In the second stage of the sequencing/sorting, the mail pieces are diverted via RADs (not labeled) into respective frame transports. It should be noted that the numbers on the mail pieces in the second stage reflect the second stage group ordering. Additionally, it should be noted that with this exemplary embodiment, upon being merged, the mail pieces are within groups of ninety, as there were nine frame transports in the first stage of sequencing and ten frame transport tubes in the second stage of sequencing. It should be appreciated that the output of the second stage can be cascaded to a third stage, etc. As such, additional stages and frame transports may be added to sequence any size group of mail pieces. Thus, with this exemplary embodiment, the third stage can be an intermediate or a final stage. Moreover, in embodiments, as each frame transport in sequenced order in a final stage the output may be retrieved at full conveyor speed.

More particularly, FIG. 2F shows frames being diverted from a main branch MB into different divert sections DS. From these divert sections, the frames can then be further diverted into a second main branch $MB_2$ and thereafter into additional divert sections $DS_2$. Although only two main branches and divert sections are shown, those of skill in the art will realize that more than two cascading sections are contemplated by the present invention. In this example, the main branch MB includes some frames that may have been sequenced to a certain depth with relation to other mail pieces in the group. The frames are diverted to the diverts DS and, depending on the sorting algorithm, are diverted in a certain order to the main branch $MB_2$. Positions on an output conveyance path, e.g., main branch $MB_2$, that mail pieces will occupy after sequencing are shown with dashed lines. Thereafter, the frames are diverted into the diverts $DS_2$ in a certain order based on the sorting algorithm. This cascading process can continue until all of the mail pieces with a frame are sorted to a certain depth or sequenced. As such, the bottom of the figure representatively shows a snapshot of on-going sequencing operations.

As should be recognized, the input stream brings in a continual stream of mail pieces. For the sortation to work, the conveyor does not have to slow down or stop but just continually sort the mail. For this sortation, it does not matter about the sequence of future or past mail pieces; just the mail pieces in the group. Therefore, there is no need to know the destination of every mail piece before sorting can begin (as with current "n-pass" sorting used by the USPS). All the sorting requires knowing is the order within the group. However, it should be recognized that using the ZIP code, it is possible to use a sort scheme or plan to always determine the order of a group of mail pieces. Second, all mail pieces are sequenced in relation to all other mail pieces.

So another sorting stage is introduced with reference to FIG. 2F, for example. In this stage the sequence groups are each diverted to a separate tray. For illustration purposes, 10 sort trays are used for this sorter. As should be understood, mail pieces are diverted out in sequence, e.g., groups of 90 mail pieces in sequence order. Additional stages can be added to have any group size.

Figure 2G:
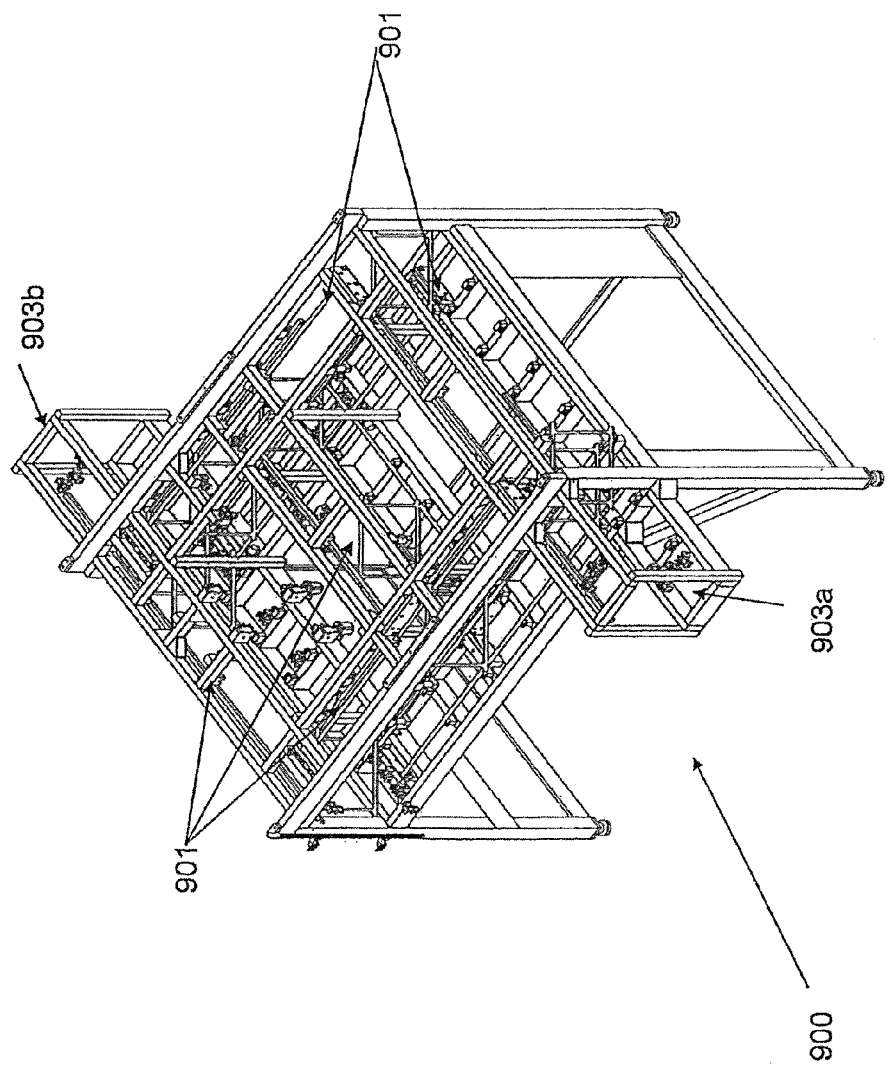
FIG. 2G shows a perspective view of a non-limiting embodiment of a conveyance module in accordance with aspects of the invention.

FIG. 2G shows a non-limiting example of a perspective view of a sorting and/or sequencing module 900 that may be implemented within a sorting and sequencing system. The module 900 includes a plurality of conveyance paths 901, at right angles to one another. These conveyance paths 901 may be representative of the conveyance paths shown in, for example, any one of FIGS. 2A-2E. The sequencing module also includes docking stations 903a and 903b, designed to dock with shuttles. The docking stations 903a and 903b can be an input docking station and an output docking station, respectively. That is, the docking station 903a can be provided for shuttles to input frames into the module and the docking station 903b can be provided for shuttles to receive frames from the module.

It should also be understood by those of skill in the art that the module 900 is configurable; that is, the modules are designed in such a way that the two or more modules can be interconnected to one another at the docking stations, for example, or at any of the conveyance paths 901. This makes the system flexible for enlarging or minimizing the processing capabilities of the system by simply adding or subtracting modules from the system. Also, it should be understood by those of skill in the art that any of the conveyance paths may also be eliminated or added, depending on the particular application. For example, the middle conveyance path can be eliminated or an additional middle conveyance path can be added to the system. As such, it is contemplated that the module provided in FIG. 2G may be reconfigured to accomplish any necessary filtering of mail pieces required by being expanded, multiplied, reduced, or otherwise reconfigured so as to accommodate the various needs of a given sorting and/or sequencing system. The module 900 also forms the basis for various machines including, but not limited to, multiplexers, sequencers, induction units, and presort accumulators.

Figure 2H:
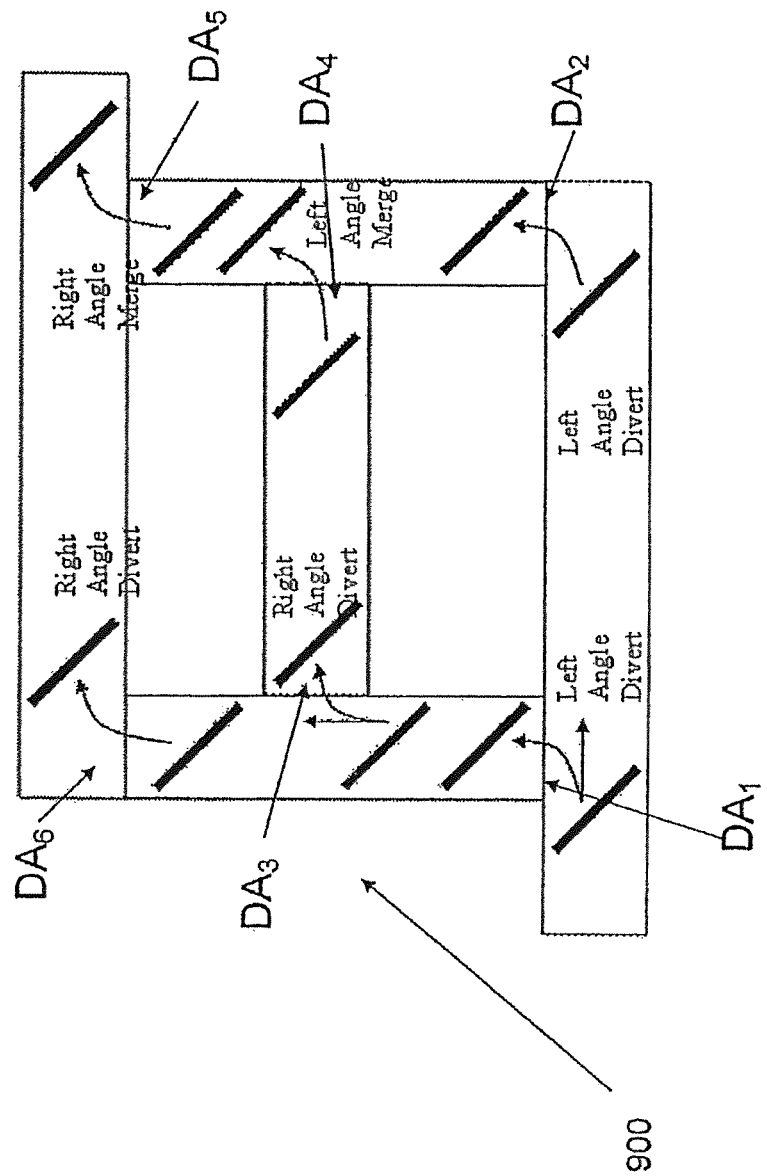
FIG. 2H shows a schematic of a non-limiting embodiment of right angle diverts in the conveyance module of FIG. 2G in accordance with aspects of the invention.
Figure 2:
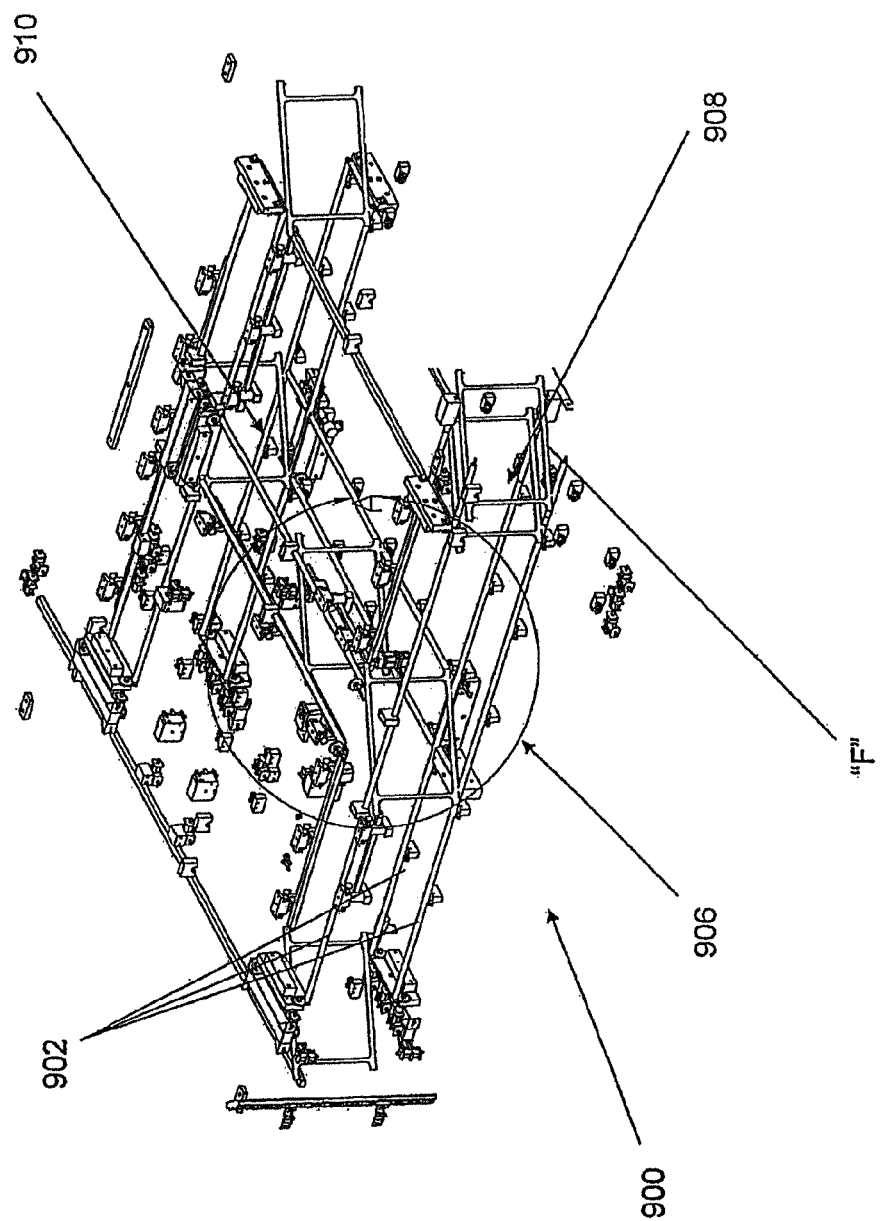
FIG. 2I (A) shows a perspective view of the non-limiting embodiment of the conveyance module of FIG. 2G without support frames of the module in accordance with aspects of the invention.
FIG. 2J shows perspective views of a rotating cam divert mechanism in accordance with aspects of the invention.
FIG. 2K shows a top view of the non-limiting embodiment of the conveyance module of FIG. 2G without the support frames of the module in accordance with aspects of the invention.
FIG. 2L shows an exploded view of FIG. 2K showing a top view of the rotatable cam divert mechanism in accordance with aspects of the invention.
FIG. 2M shows a top view of a rotatable cam in a bypass setting in accordance with aspects of the invention.
FIG. 2N shows a top view of a rotatable cam in a divert setting in accordance with aspects of the invention.
FIG. 2O shows perspective view of a pinch belt divert mechanism in accordance with aspects of the invention.
FIG. 2P shows an exploded view of FIG. 2O showing lift mechanisms in accordance with aspects of the invention.
FIG. 2Q shows a perspective view of a non-limiting embodiment of a vertical divert mechanism in a bypass setting in accordance with aspects of the invention.
FIG. 2R shows a perspective view of the vertical divert mechanism of FIG. 2Q in a divert setting in accordance with aspects of the invention.
FIG. 2S shows a perspective view of another non-limiting embodiment of a vertical divert mechanism in a bypass setting in accordance with aspects of the invention.
FIG. 2T shows a perspective view of the vertical divert mechanism of FIG. 2S in a divert setting in accordance with aspects of the invention.
FIG. 2U shows a perspective view of a threaded roller conveyance system having a rotatable slotted cam divert mechanism in accordance with aspects of the invention.
FIG. 2V shows a perspective view of a non-limiting example of a 45 degree divert mechanism within a tooth belt conveyance system in accordance with aspects of the invention.
FIG. 2W shows a perspective view of a non-limiting example of an inset compression zone in accordance with aspects of the invention.
FIG. 2X shows a top view of the inset compression zone of FIG. 2W in accordance with aspects of the invention.
FIG. 2Y shows a perspective view of a non-limiting example of an inline compression zone in accordance with aspects of the invention.
FIG. 2Z shows an exploded top view of the inline compression zone of FIG. 2Y in accordance with aspects of the invention.

More particularly, FIG. 2H shows various conveyance paths and diversion options of a frame conveyed through the module of FIG. 2G, from an entrance to an exit. In embodiments, at the point of any diversion, the trailing edge of the frame (in the input conveyance path) will direct the frame to the divert direction. That is, the frame will be diverted into an alternative path by its trailing edge. In an active divert area, frames may either be diverted or they may bypass the point of diversion to continue along the input conveyance path to some subsequent output conveyance path (depending on the specified algorithm controlling movement of the frames). Frames may also be merged with other frames as they are diverted.

By way of illustration, at induction, the frame can perform an active left angle divert or a passive left angle divert. More specifically, the frame can be actively diverted leftward at divert area $DA_1$. This is an active divert because the frame has the option of traveling in a straight path. Alternatively, the frame can be passively diverted leftward at divert area $DA_2$. This is a passive divert, as the frame must be diverted at this position.

Taking the flow path from the active divert area $DA_1$, the frame can travel to either divert area $DA_3$ or divert area $DA_6$. At divert area $DA_3$, the frame can be actively diverted rightward and then passively diverted left at divert area $DA_4$. At this left angle divert, the frames are merged in the conveyance path with frames that were passively diverted at divert area $DA_2$. In a merge, the input conveyance path runs into an output conveyance path carrying a plurality of frames and extending in perpendicular to the direction of the input conveyance path. Again, there is an active divert because the frame has the option of traveling in a straight path. The frames from divert area $DA_2$ and divert area $DA_4$ would then merge at divert area $DA_5$ with frames passively diverted at $DA_6$ to the exit.

Taking the flow path from divert area $DA_3$, the frame can be passively diverted through right angle divert at divert area $DA_6$ to the exit. Similar to the diverting process at divert area $DA_4$, the frames are merged in the conveyance path with frames that were passively diverted at divert area $DA_2$.

As thus described, utilizing diverts allows mail to be continuously processed to various locations throughout the mail sorting and/or sequencing system without compromising the speed of the conveyance system. Diverting of the mail pieces improves sorting, sequencing, and storing mail pieces for delivery to predetermined destinations. Processing of mail pieces is further enhanced because slot spaces for frames need not be fixed (e.g., during a merge) for a given diverted mail piece. That is, since the overall system knows the thickness and monitors the position of the mail pieces at all times, only the space necessary for the mail piece may be reserved for increased efficiency during conveyance. Using the diverts in this manner is also an improvement over existing mail systems in that waiting for all the mail to arrive to start processing is eliminated, as is having to manually run the mail through many different passes to properly sort, sequence, store, and deliver the mail.

Divert Mechanisms and Related Conveyances

The right angle divert advantageously achieves a high throughput of frames (i.e., frames per second) at low transport speeds (i.e., inches per second). Achieving the high throughput is accomplished by orienting the frames in the front-to-back stacked manner as discussed above such that the distance between frames (or "pitch") is as small as possible. In embodiments, each frame is provided with at least one pin (e.g., at a top end of the frame) or other mechanism in order to effectuate diversion. Also, in embodiments, the distance between pins of stacked frames will be the same as the distance between the frames, respectively. Therefore, since the distance between frames should be small, the distance between pins should also be minimized.

Active diverts are accomplished by a divert mechanism. The divert mechanism selectively diverts any, all, or none of the frames that cross its path. Thus, the divert mechanism is capable of acting on each individual pin such that the divert mechanism may switch from the input conveyance path to the diverted output conveyance path and back to the input conveyance path between each approaching pin (i.e., frame). This requires fast switching times to accommodate the high throughput and small frame pitch. Alternatively, the divert mechanism may allow a plurality of frames to be diverted before switching back to the input conveyance path to allow other frames to bypass the divert. Thus, the present invention contemplates a variety of divert mechanisms used in conjunction with the various conveyance mechanisms to efficiently move mail pieces throughout the mail sorting and sequencing system.

Rotating Cam Divert Mechanism and Lead Screw Conveyance

Figure 2I:
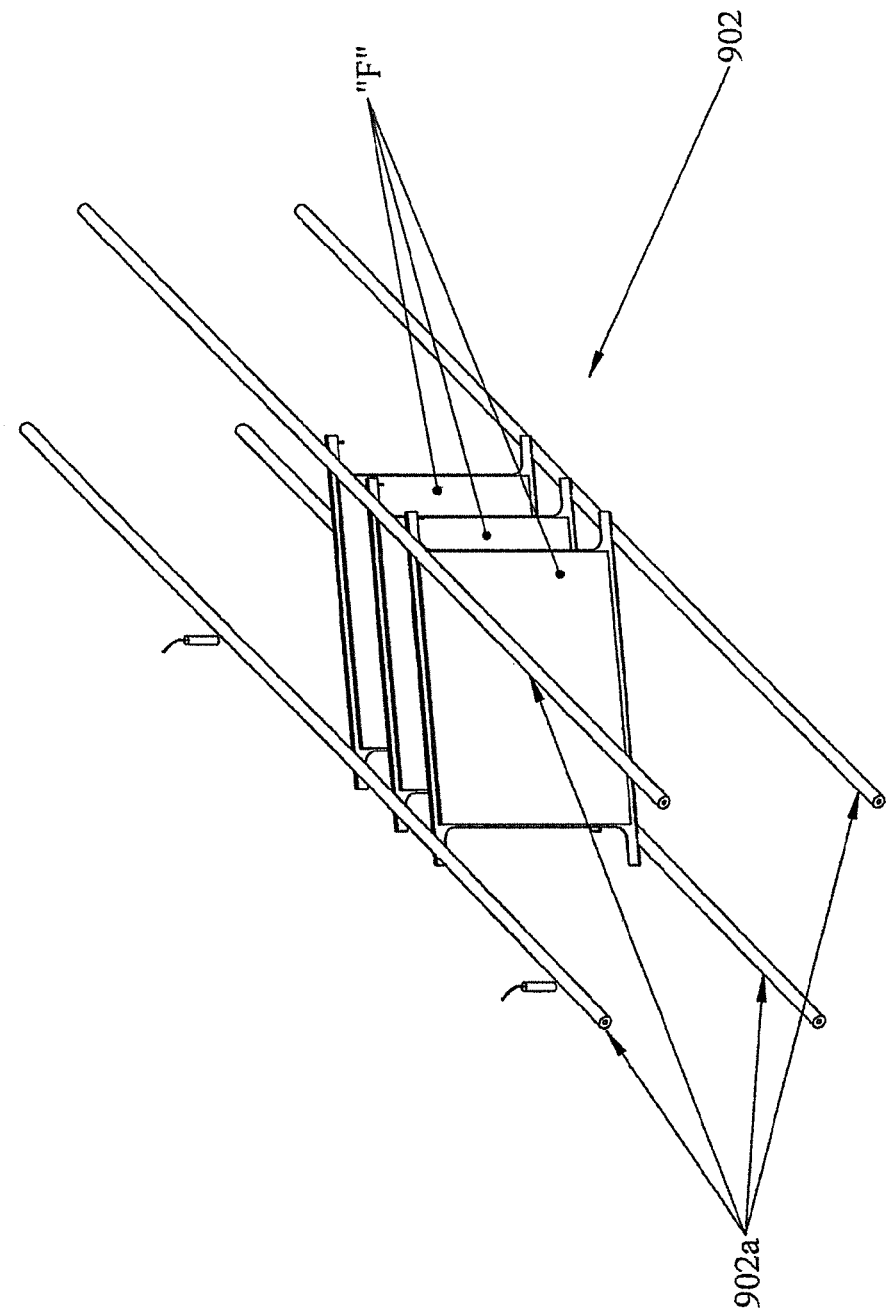

FIG. 2I (A) shows a perspective view of the non-limiting embodiment of the conveyance module of FIG. 2G without support frames of the module in accordance with aspects of the invention. More specifically, FIG. 2I(A) shows a perspective view of the module 900 as discussed above without the support framing to show a four lead screw conveyance system 902 which conveys frames F within the module 900. In embodiments, diverts in a lead screw conveyance system may be accomplished by a rotating cam divert mechanism, as discussed further below. As shown in FIG. 2I(A), the circled area labeled (A) depicts the area of an active right angle divert. That is, a rotating cam divert mechanism 906 interacts with a given frame F (or plurality of frames) to divert the frames F from an input conveyance path 908 to an output conveyance path 910, e.g., divert the frame at a right angle.

Figure 2J:
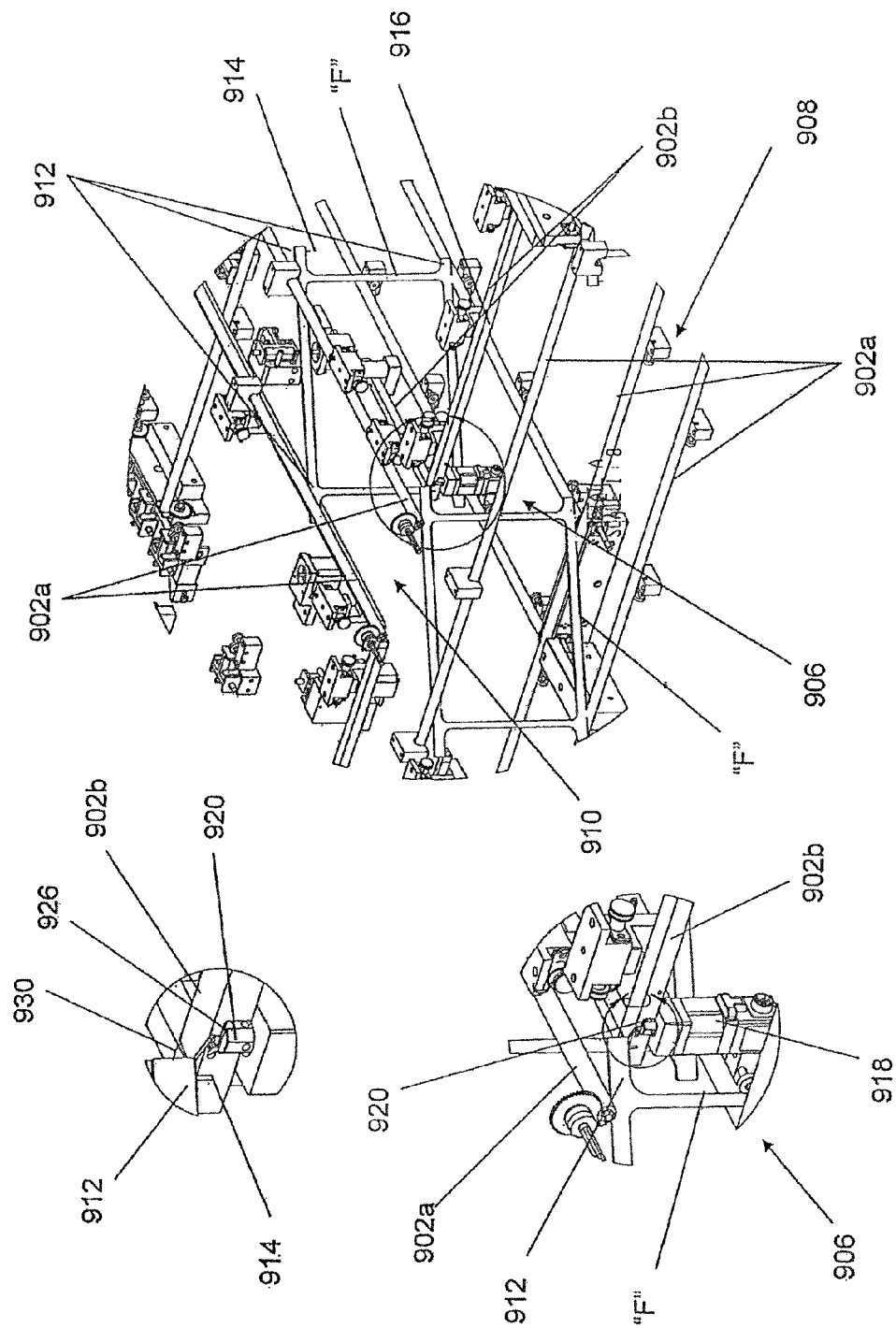
Figure 2K:
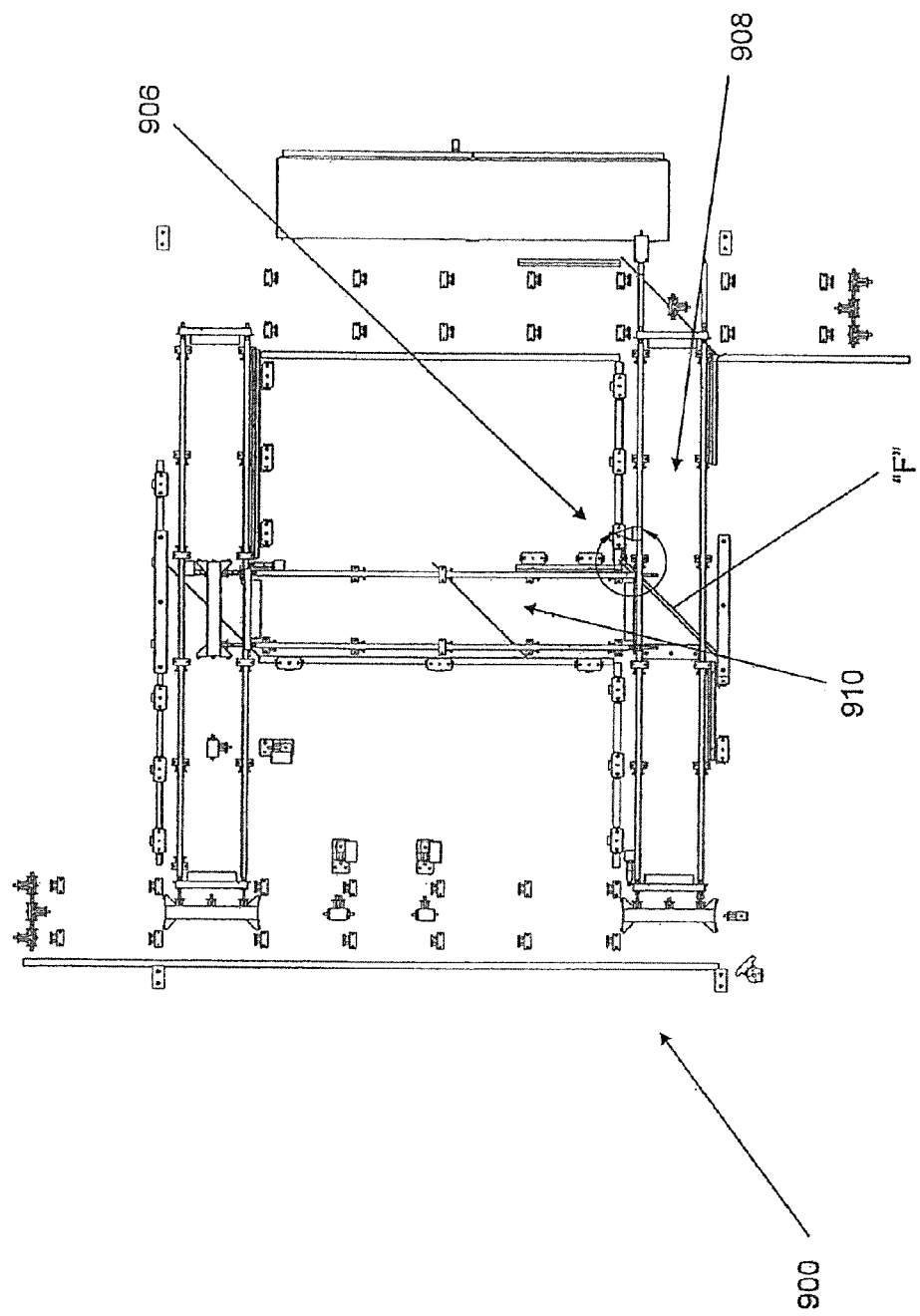
Figure 2L:
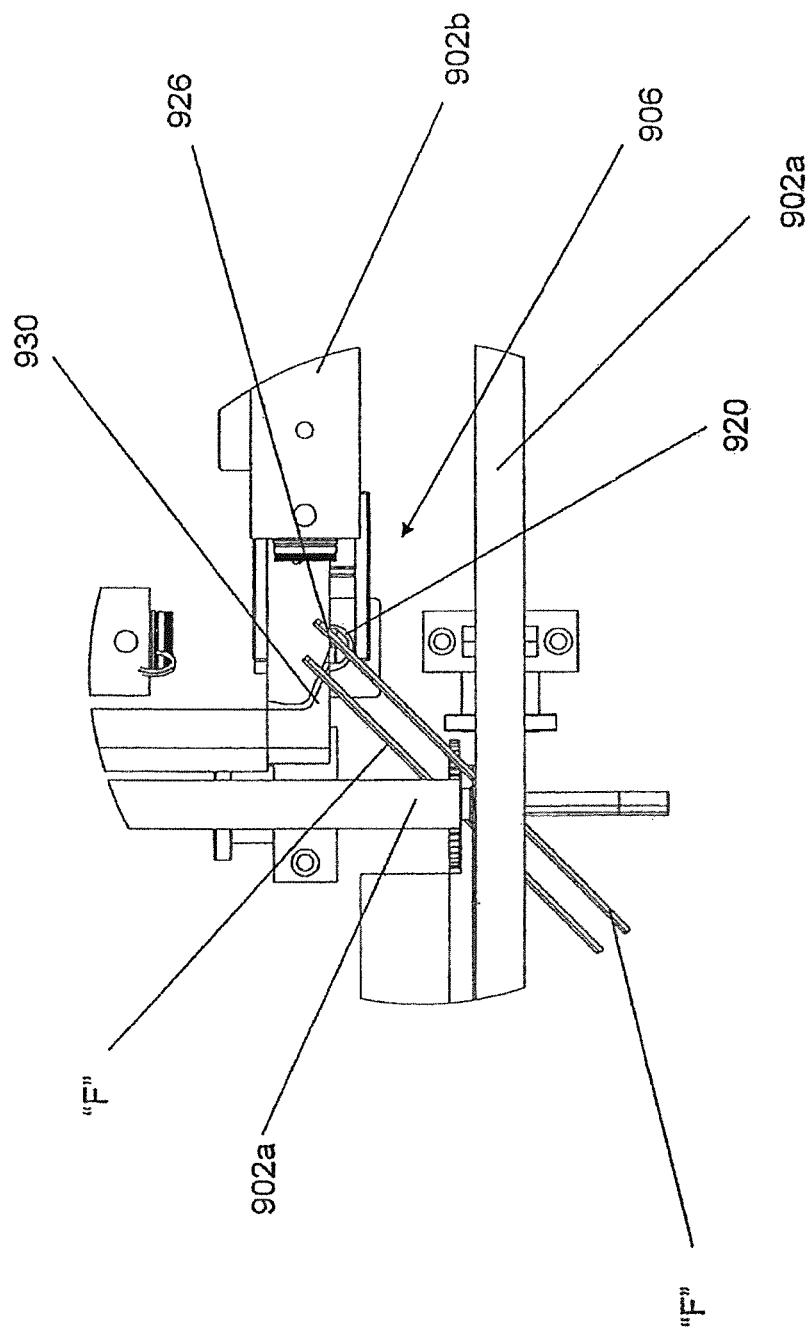
Figure 2M:
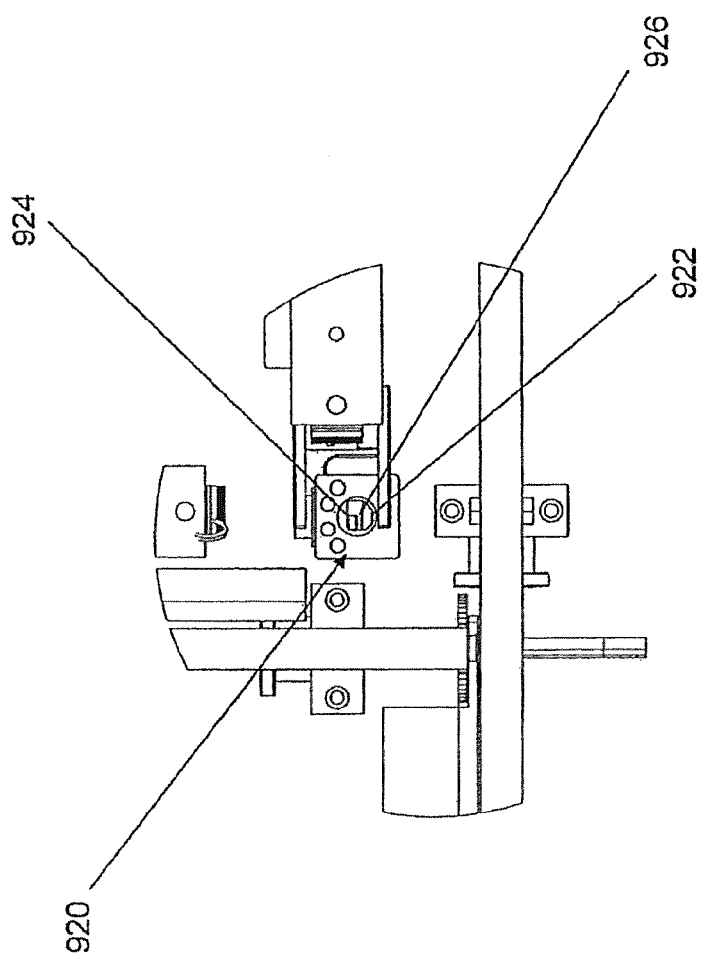
Figure 2N:
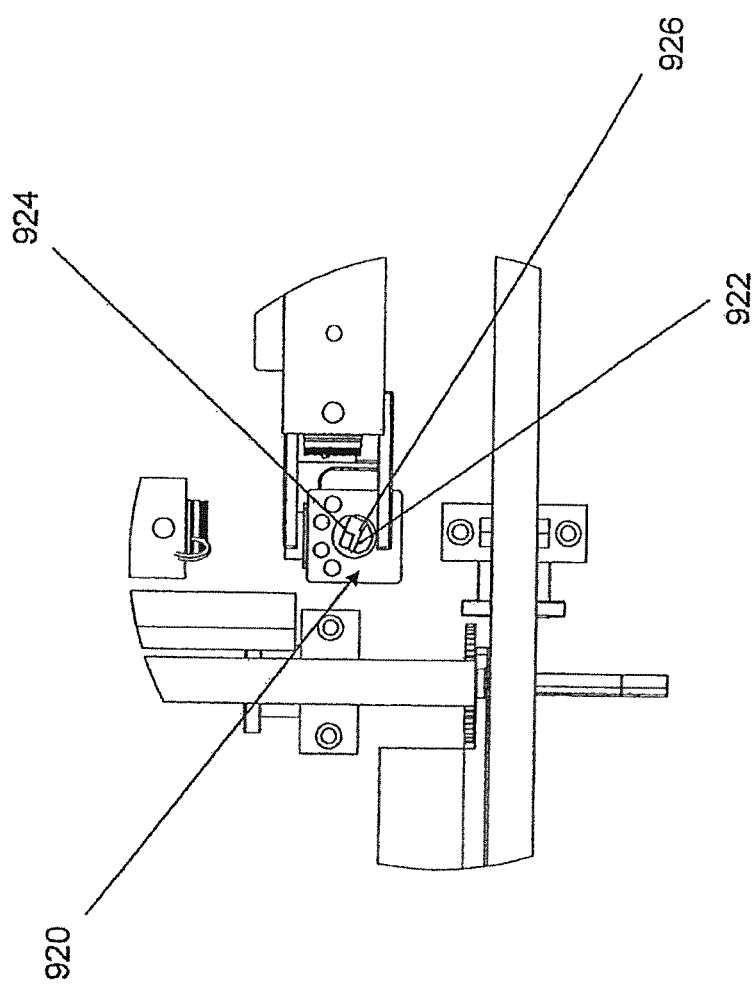
Figure 2O:
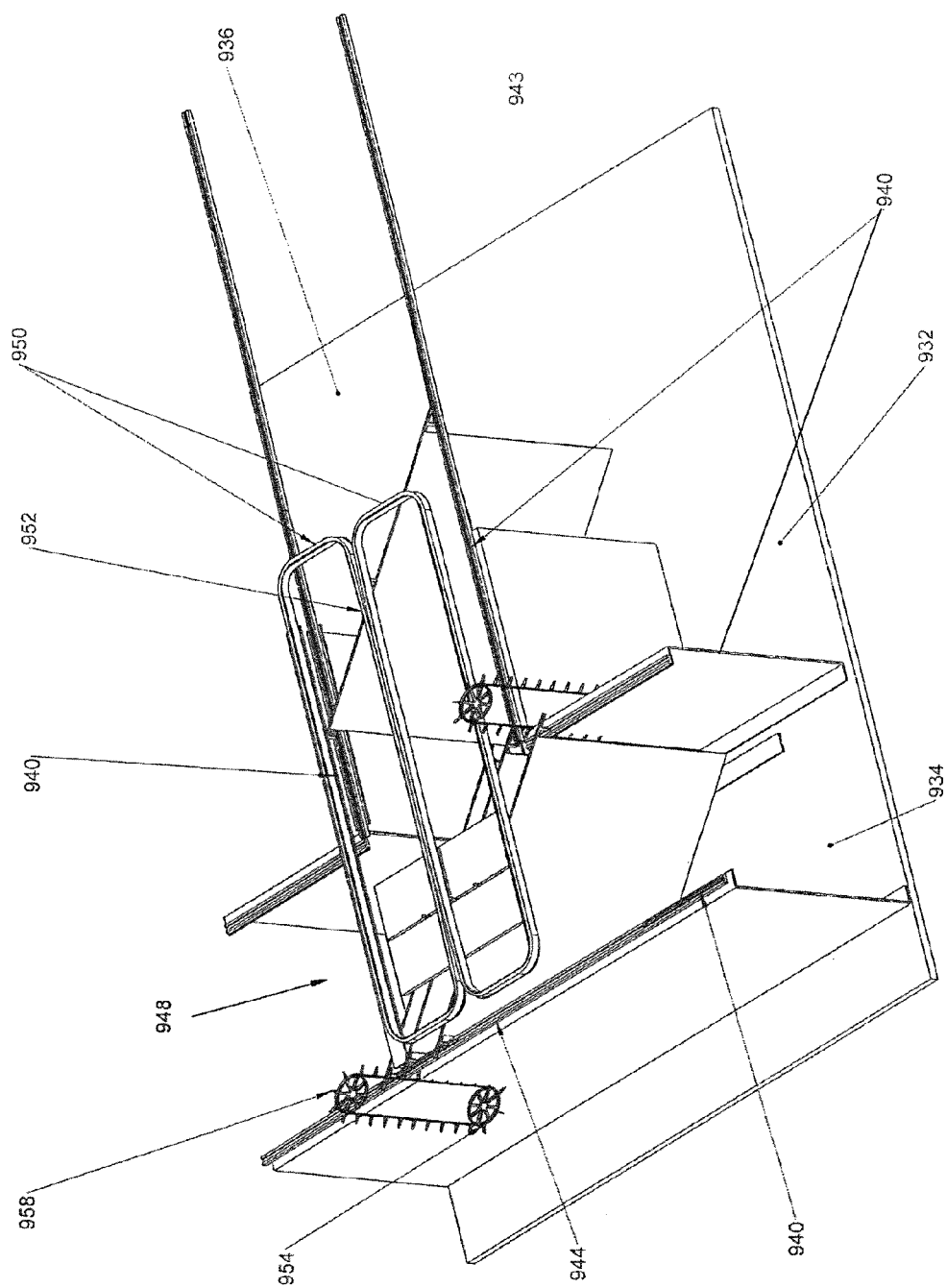
Figure 2P:
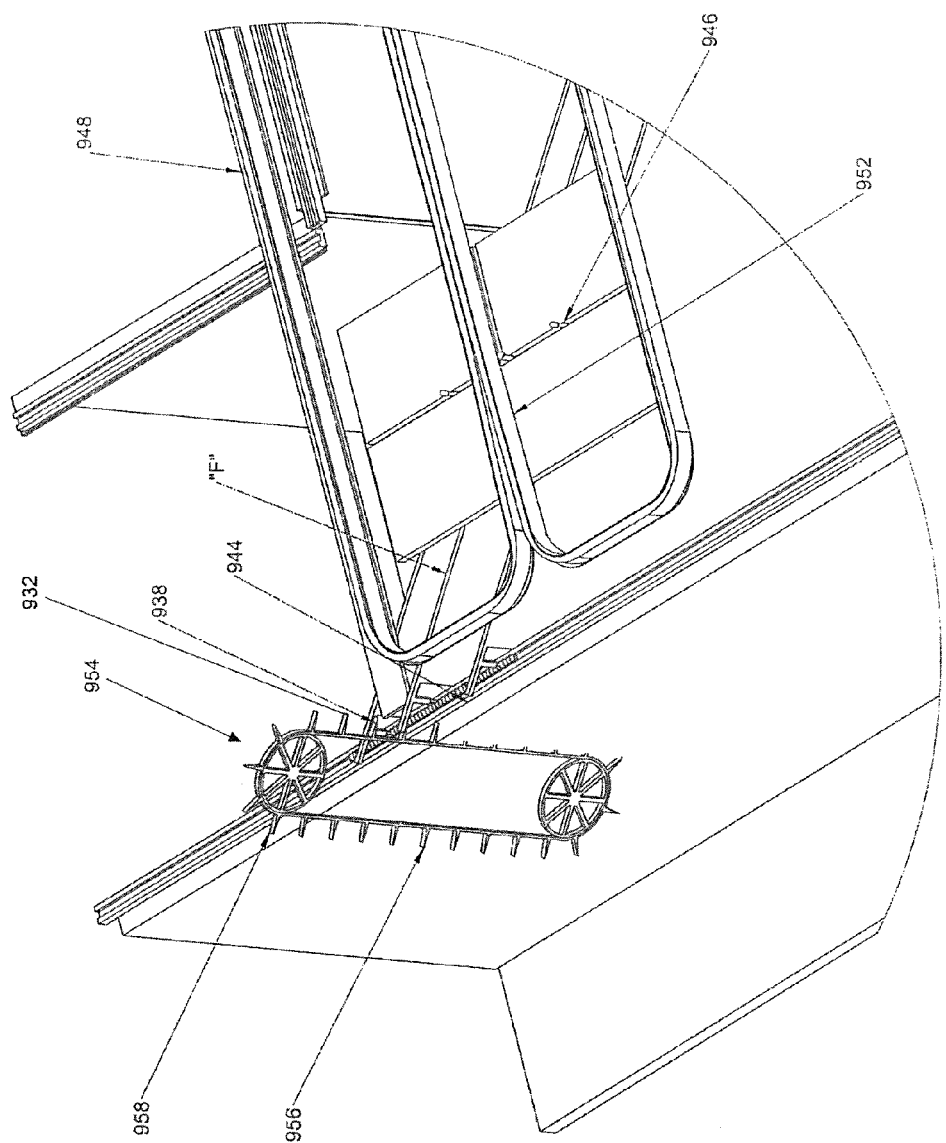
Figure 2Q:
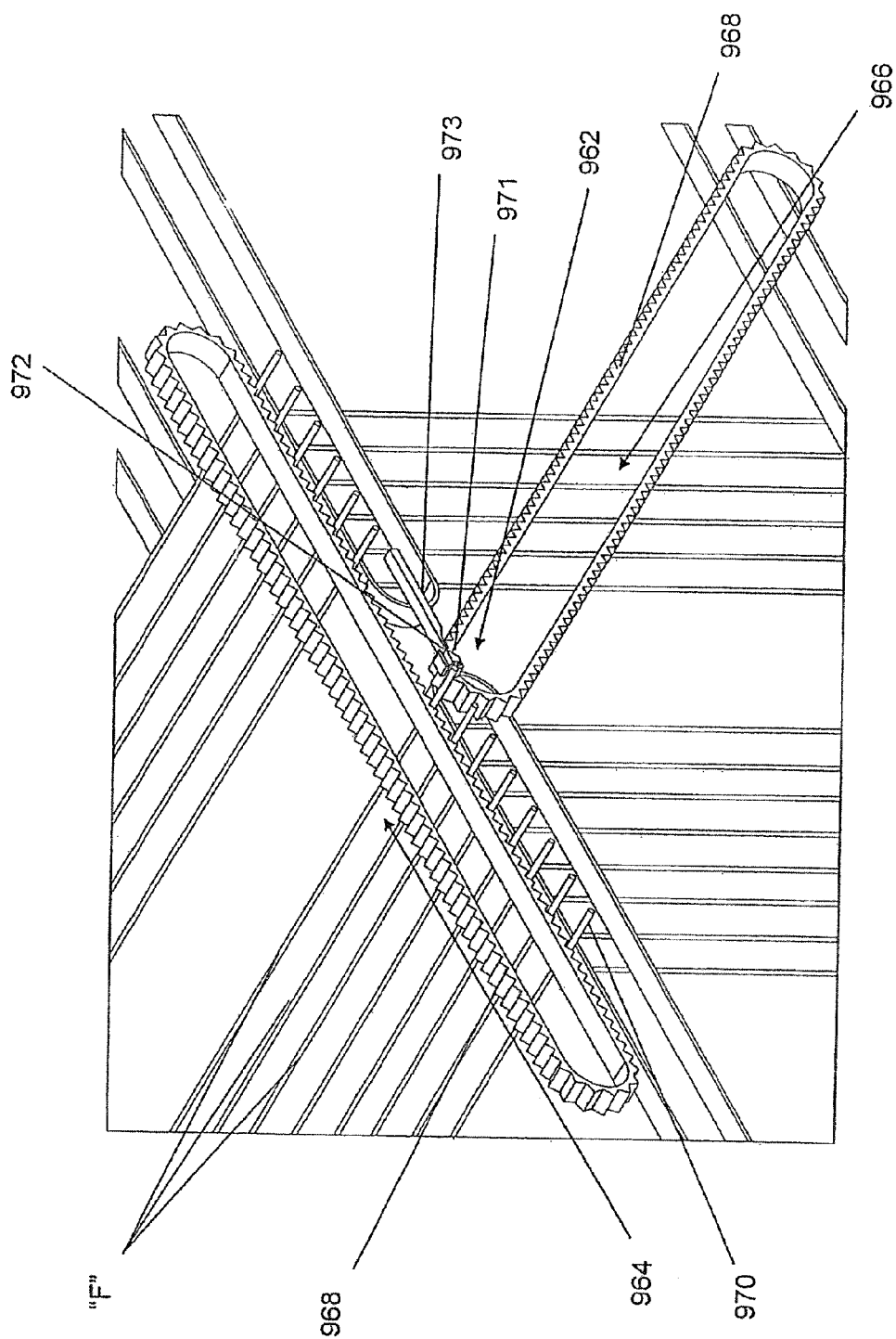
Figure 2R:
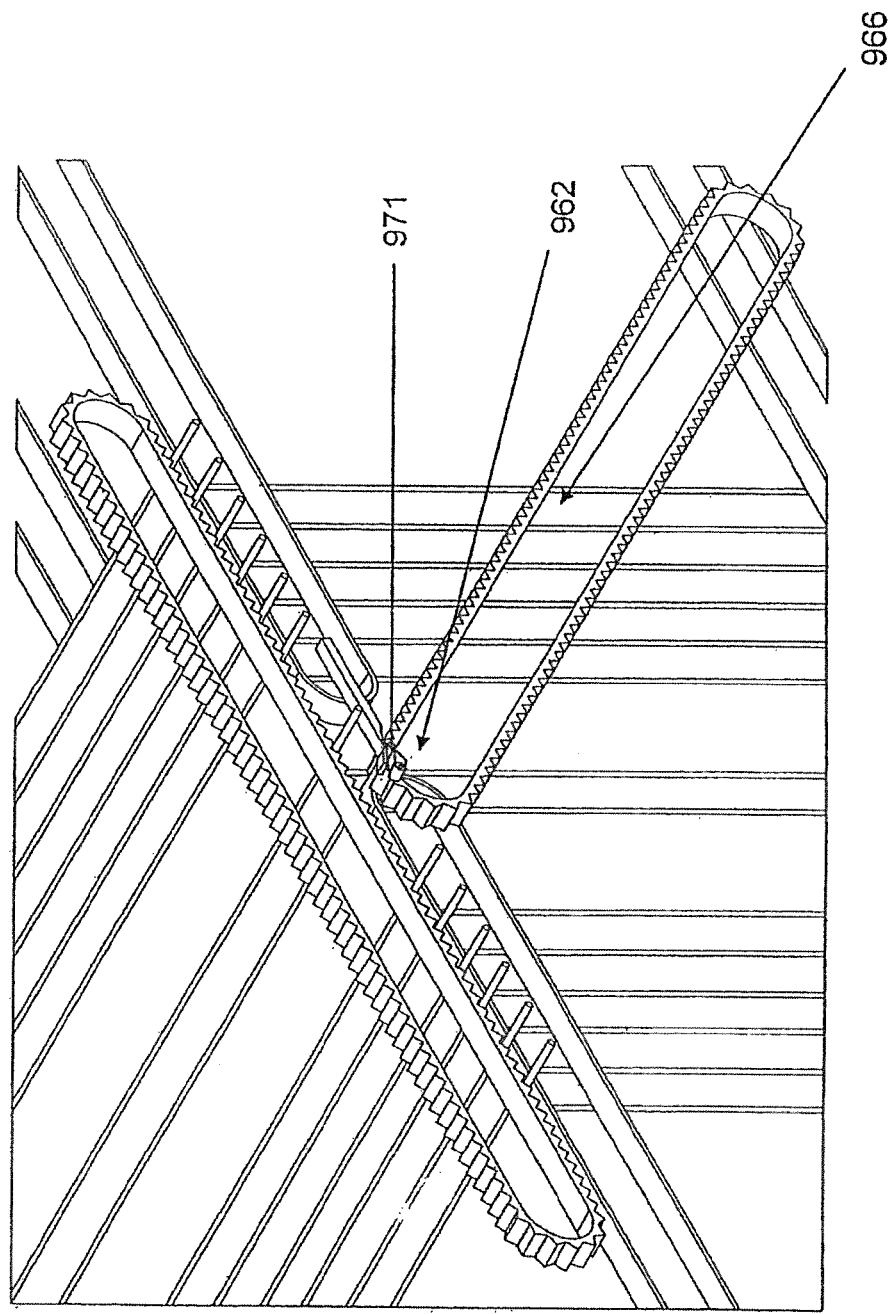
Figure 2S:
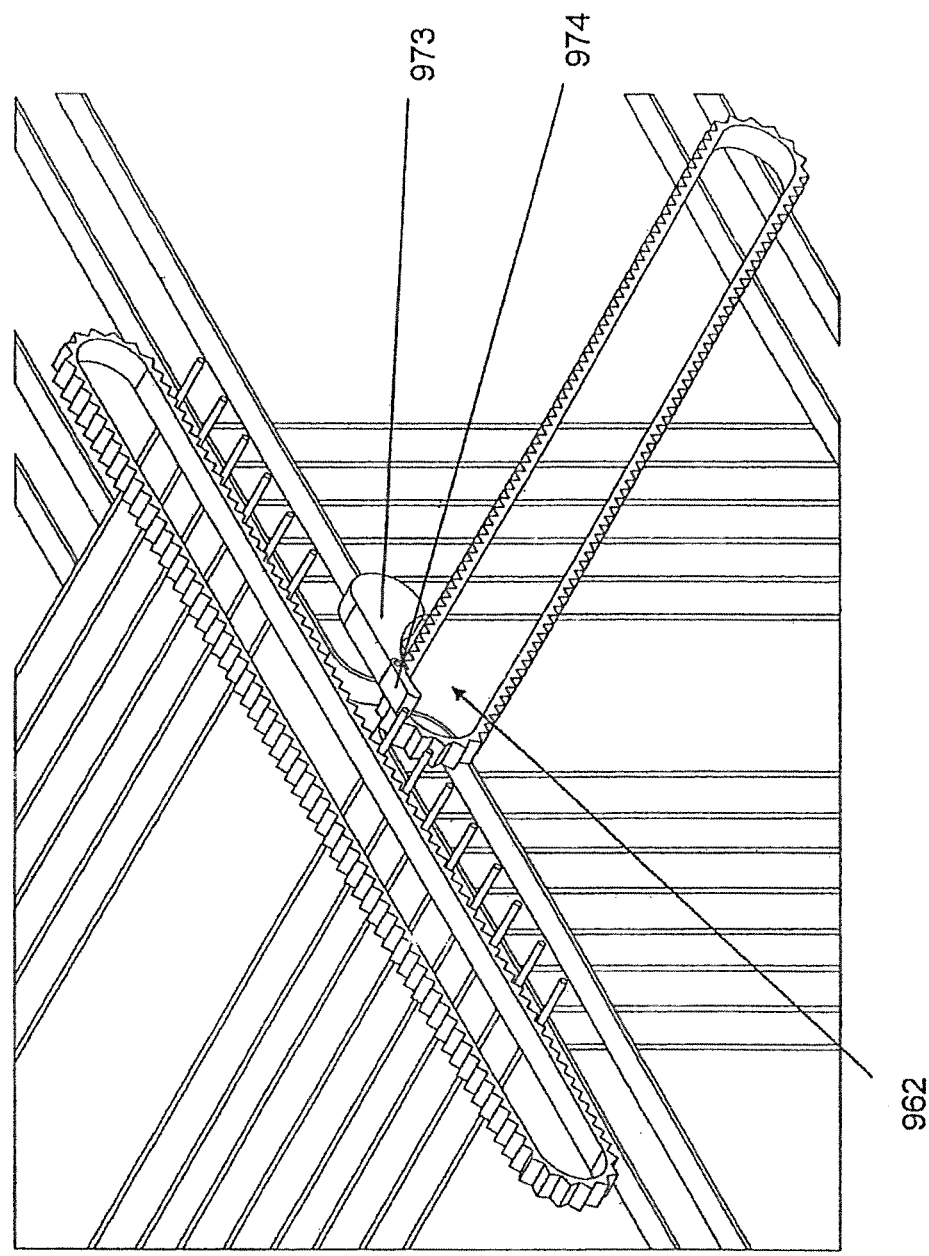
Figure 2T:
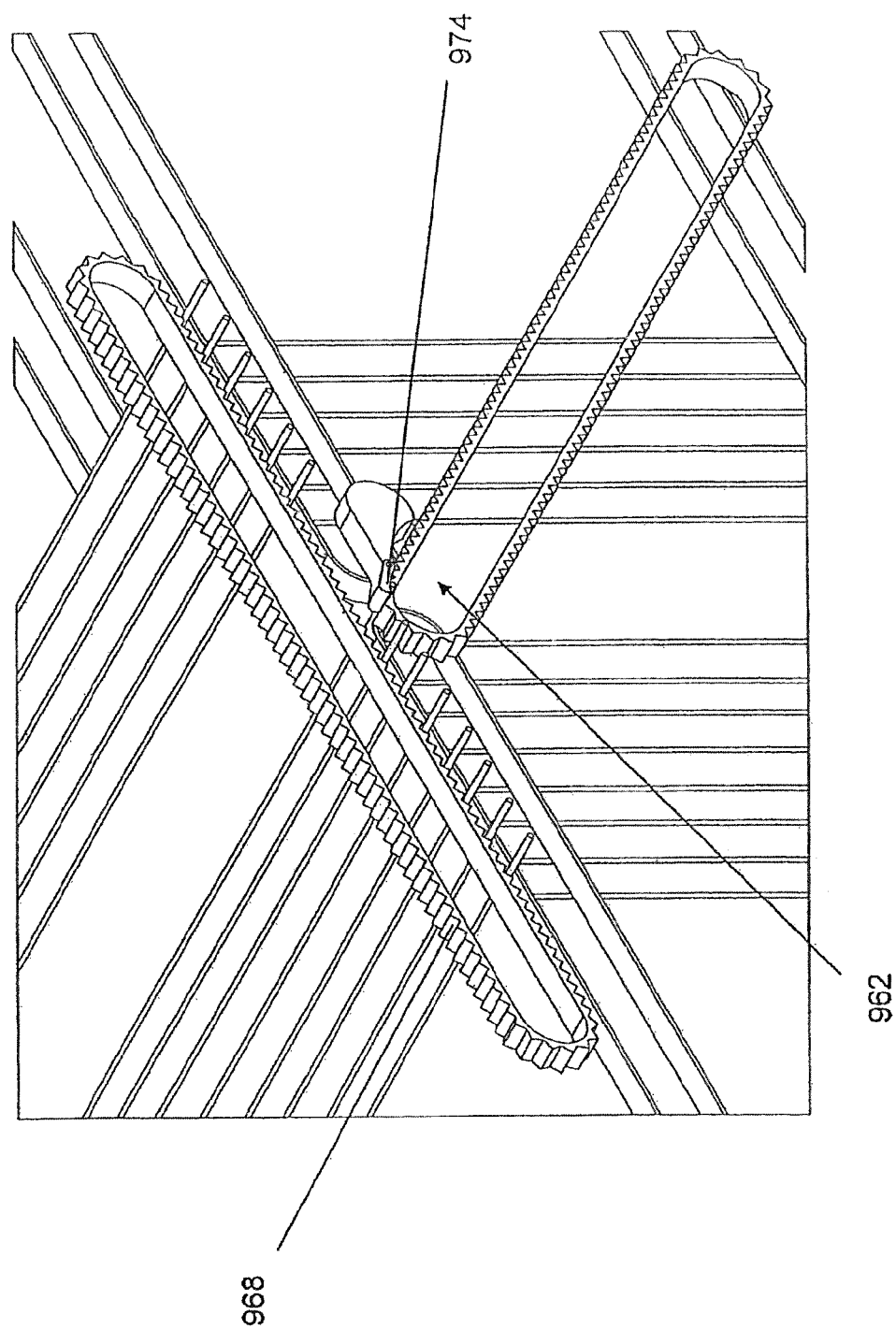
Figure 2U:
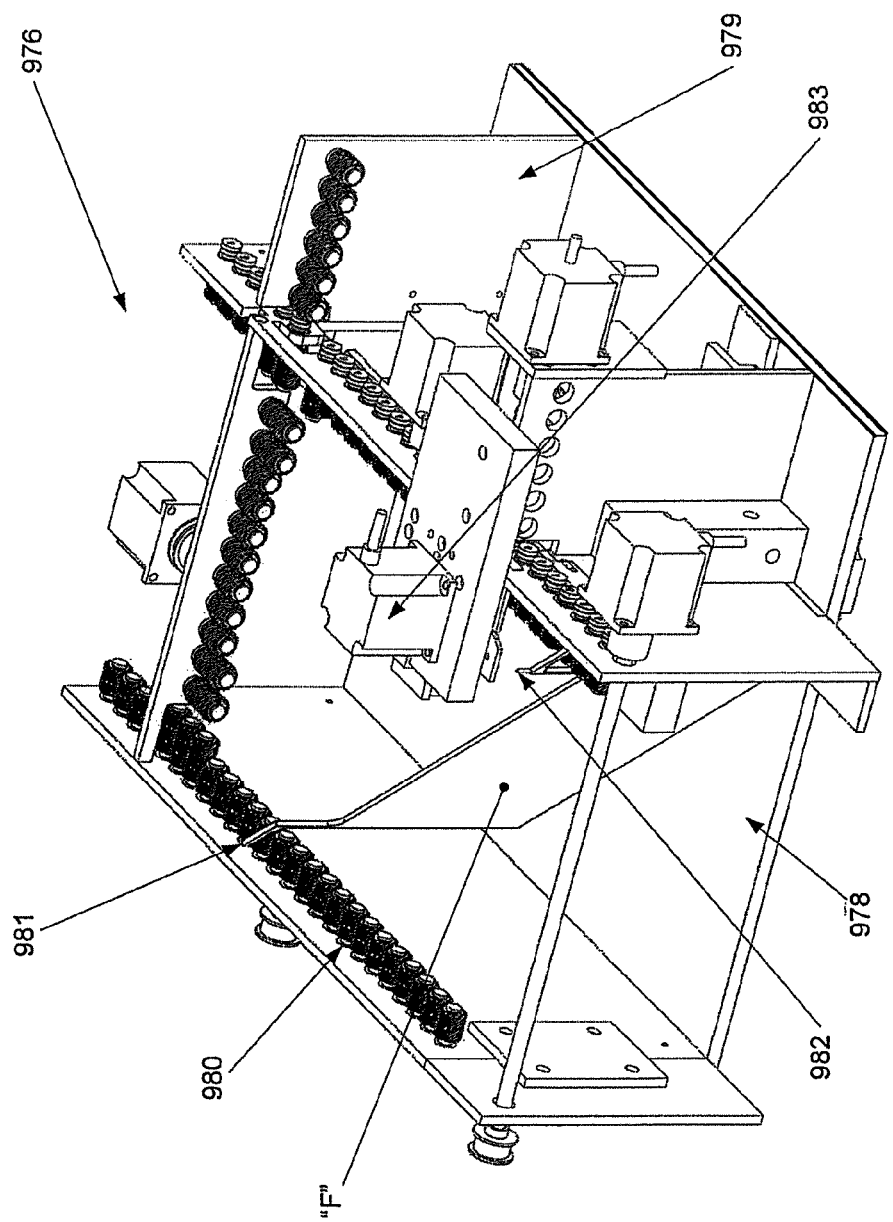
Figure 2V:
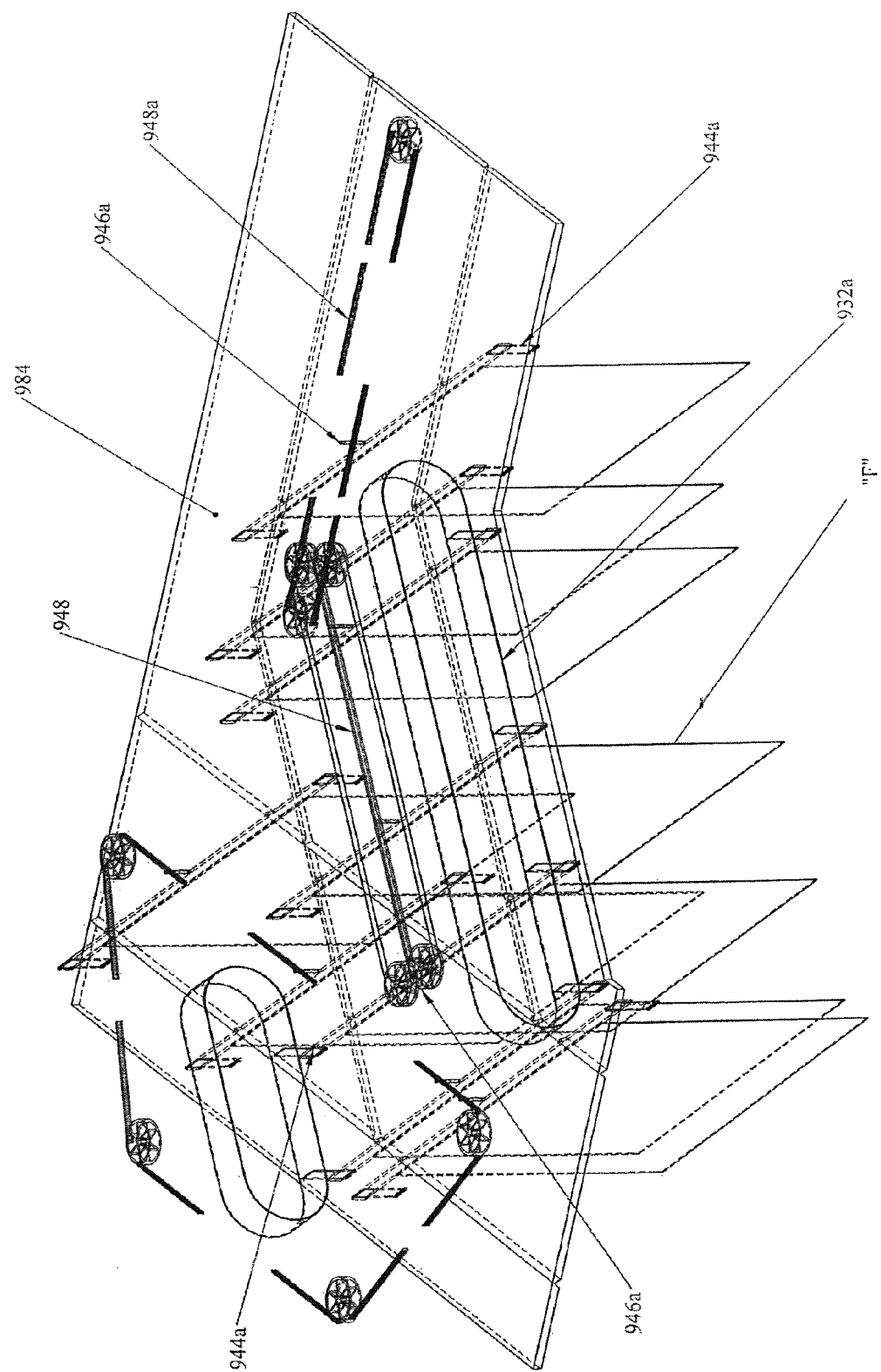
Figure 2W:
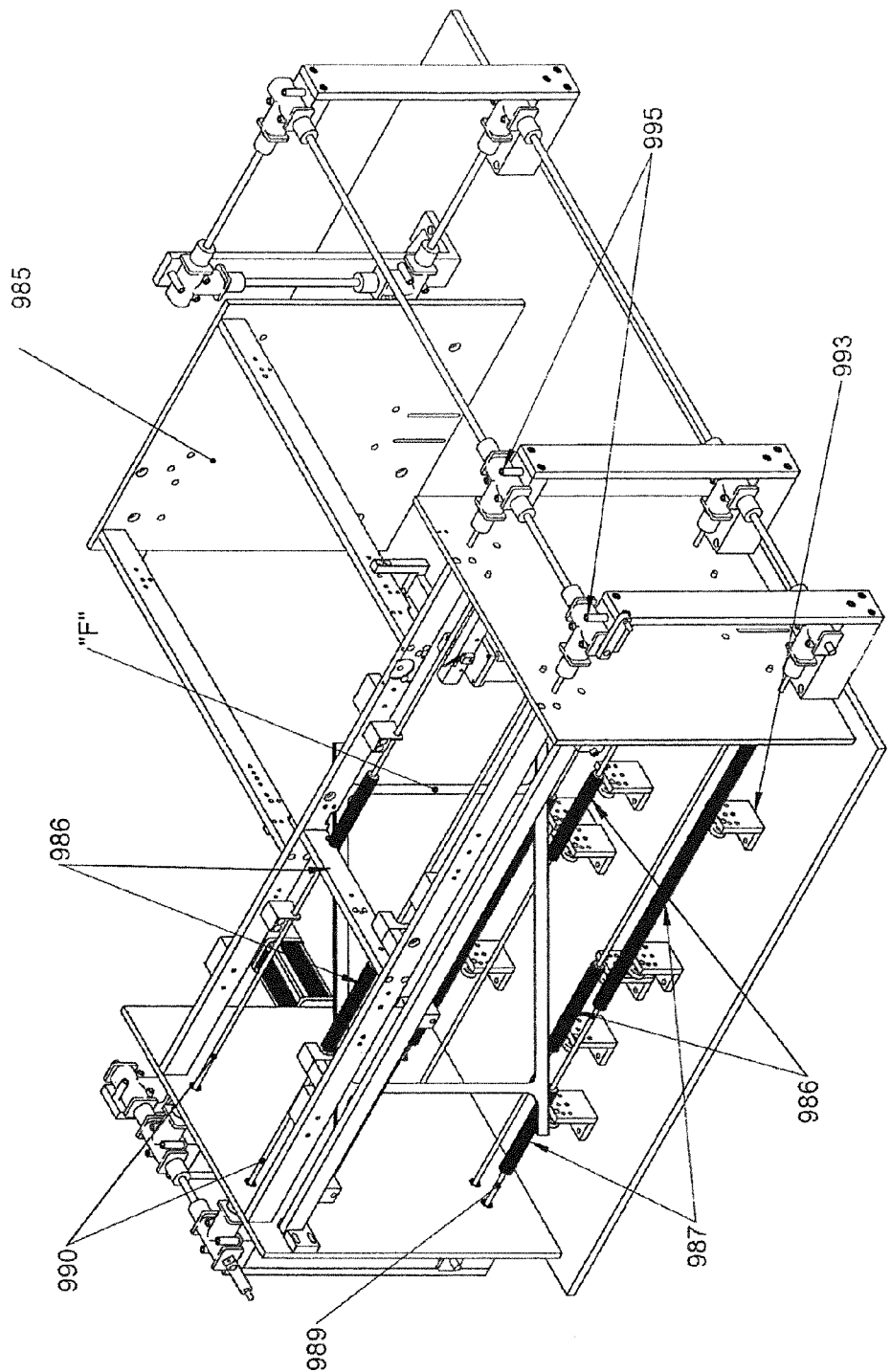
Figure 2X:
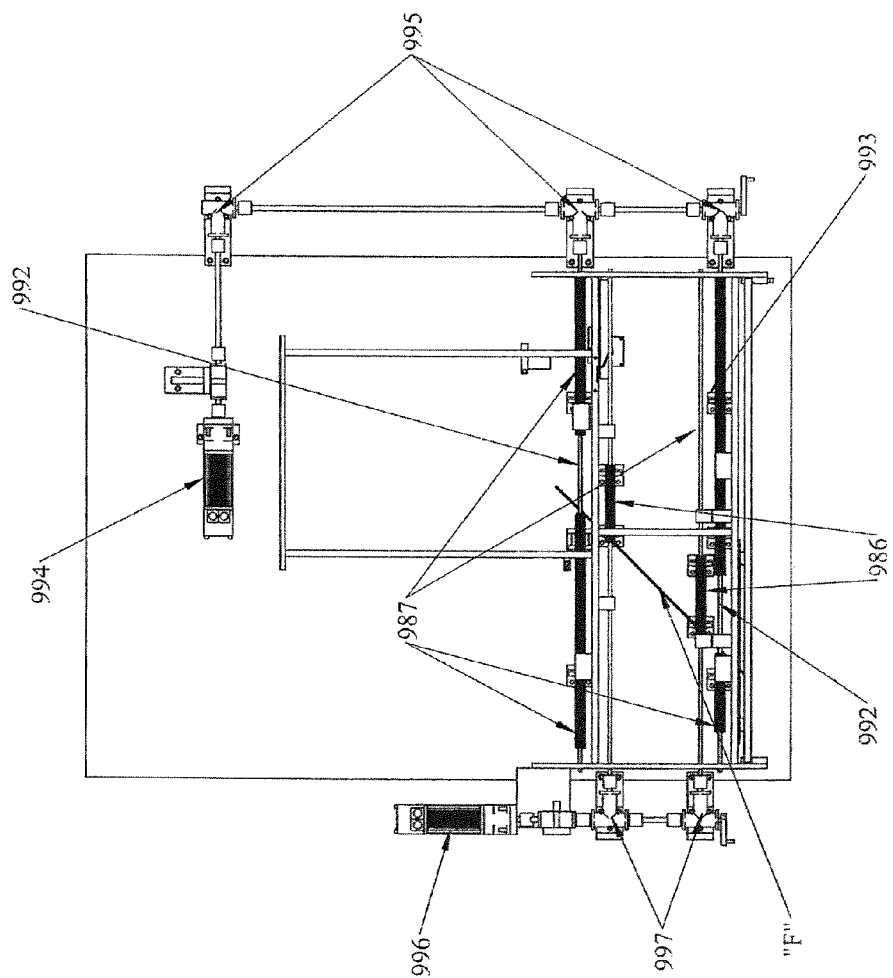

FIG. 2I(B) shows the four lead screw conveyance system as further described with respect to FIG. 2W and FIG. 2X. The four lead screw conveyance system includes a set of at least four lead screws 902a (two provided at a lower portion of the conveyance path and two provided at an upper portion of the conveyance path). The upper lead screws 902a are parallel to each other in a width direction and parallel to the lower pair in the height direction as both ends extend along the length of the main conveyance path. The lead screws 902a are designed and structured to support the frames F at upper and lower edge ends thereof. The lead screws 902a also rotate parallel to each other.

Threads of the lead screws 902a have a pitch such that the frames F are angled at 45 degrees to the direction of travel of the lead screws 902a and are transported along the lead screws 902a to readily and easily engage various divert sections and compression zones without compromising the conveying speed of the system. In this regard, and referring to FIGS. 2I(B), 2W, and 2X, the lead screws 902a may be powered by an independent motor 994. More specifically, lead screw drive shafts 989 are driven by the motor 994 (which in turn drives the lead screws 902a) and may include at least one, one-to-one right angle gear box 995 to provide uniform synchronized rotation of the lead screws 902a during operation based upon the output of the motor 994. The right angle gear box 995 is provided so as not to limit the configuration of the system, and may be utilized in an unlimited number of possible configurations for the motor 994, drive shafts 989, and lead screws 987 depending on spacing constraints, etc.

Using the one-to-one gear ratio, it is ensured that all of the lead screws in a given conveyance system rotate at the same speed. This includes main conveyance paths, as well as any divert sections or compression zones the main conveyance path may encounter. As such, the uniform rotation speed of the lead screws 902a ensures, e.g., that during a divert bypass, even though the frame F contacts lead screws 902a of the diverted conveyance path, the contact will not impede the forward progress (or constant speed) of the frame along the main conveyance path. However, during a divert, the speed of the diverted frame F is also not affected because of the 45 degree orientation the frame F has with respect to the a direction of travel. That is, the frame F has a natural tendency to move in the direction of the divert and transition of the trailing edge does not impede the speed of the diverted frame F, nor does it slow subsequent frames traveling down the main conveyance path.

Referring to FIGS. 2I(B), 2W and 2X, the lead screws 902a are supported at a lower surface thereof by a plurality of roller cam brackets 993. The roller cam brackets 993 also maintain the lead screws 902a level with a floor surface. In alternative embodiments, the roller cam brackets 993 may also provide the driving force to rotate the lead screws 902a, in lieu of, or in conjunction with the motor 994. The present invention further contemplates that the motor 994 may be set to rotate the lead screw shafts 989 at about 110 rpm and tolerances may allow for about a 10% variance in performance.

FIG. 2J shows perspective views of the rotating cam divert mechanism 906 and related components. In particular, FIG. 2J shows a plurality of support members 902b that form conveyance paths such as, for example, conveyance path 908 and conveyance path 910. In embodiments, conveyance path 908 is at a right angle with respect to conveyance path 910. The support members 902b are also structured to support components such as, for example, the lead screws 902a, roller cam brackets 993 (FIG. 2X), one-to-one right angle gear box 995 (FIG. 2X), motor 918 (FIG. 2J), rotating cam 920 (FIG. 2L), in addition to sensors and other components that require mounting and support.

As further shown in FIG. 2J, frames F are conveyed along the conveyance path 908 and conveyance path 910 (via the lead screws). In embodiments, the frames F include a plurality of projections 912 that engage the lead screws. As the lead screws are at the same pitch and at the same speed, the lead screws in the conveyance path 910 will not interfere with the movement of the frames F as they are being transported along the conveyance path 908, past the intersection of the conveyance path 910. However, when the frames F are to be diverted, the lead screws of the conveyance path 910 will engage the frames F to divert them to the conveyance path 910, by use of the rotating cam divert mechanism 906.

As shown in the exploded views of FIG. 2J, the rotating cam divert mechanism 906 includes a motor 918 and a rotating cam 920 for diverting the frame F. The rotating cam divert mechanism 906 is provided adjacent the intersection of the conveyance path 908 and the conveyance path 910, and is preferably mounted to a support member 902b located outside and below an upper lead screw (not shown) of the conveyance path 908. This ensures that the rotating cam divert mechanism 906 will not interfere with the movement of a bypassing frame F.

In operation, the rotating cam 920 may rotate (or switch) between a bypass setting (as seen in FIG. 2M) and a divert setting (as seen in FIG. 2N). By activating the motor, the rotating cam 920 will rotate such that the pin 914 will engage a channel or slot 926 of the rotating cam 920, and be diverted into an angled groove 930 of the support member thereby directing the frame F to the conveyance path 910. In a deactivated position (i.e., a bypass setting), the rotating cam 920 will block the pin 914 from entering into the angled groove 930 such that the frame F will continue along its original path.

In embodiments, the rotating cam 920 should not commence a switching action until the previous pin 914 is clear of the rotating cam 920. However, if several adjacent frames are to be diverted, the rotating cam 920 can remain in divert setting so that multiple frames can be diverted to the conveyance path 910. This would minimize the need to constantly rotate the rotating cam 920. Also, due to the high throughput and small pitch of the frames F, the length of the rotating cam 920 should be longer than the pitch between pins 914. Therefore, one or more pins 914 can enter the rotating cam 920 prior to the switching event, and start down the path of the previous pin 914.

In the process of switching to the divert setting, the rotating cam 920 may have to push the pin(s) 914 within the rotating cam 920 back to the conveyance path 908. The pushing of pins 914 should be minimized, though. To minimize the pushing of pins 914 (without reducing throughput or increasing pin pitch) the point of cam rotation 920 can be extended. By extending the point of cam rotation, the channel length of the rotating cam 920 may be shortened. Therefore, only one of the pins will enter the inlet of the rotating cam 920 prior to the switching action. This reduces the torque required of the rotating cam 920, and the frictional wear on the frames F.

FIG. 2K shows the module of FIG. 2G from a top view without the support frames to show the active right angle divert described above. More specifically, it is shown in FIG. 2K that frames can either pass through the intersection of the conveyance paths 908 and 910, or be diverted from the conveyance path 908 to the conveyance path 910.

FIG. 2L shows an exploded view of the circled area of FIG. 2K. More Specifically, FIG. 2L shows a frame F in the act of being diverted from the conveyance path 908 to the conveyance path 910. As seen, the frame F (via the pin 914 not shown) has entered into the channel 926 of the rotating cam 920 and engaged with the angled groove 930 as it is diverted to the conveyance path 910. A subsequent frame F is also shown; however, the rotating cam 920 is in its bypass position and thus, the subsequent frame F will not follow the preceding frame F. Rather as the angled groove 930 is blocked by the rotating cam 920, the subsequent frame F will continue down the conveyance path 908.

Thus, in operation, as the frame F travels down the input conveyance path 908, the pin 914 extending from the upper end projection 912 passes into the channel 926 of the rotating cam 920. At the point of insertion into the channel 926 a sensor, e.g., photodiode or encoder, communicates with a computing infrastructure or with the rotating cam divert mechanism 906 to actuate the motor 918 to rotate (or switch) the rotating cam 920. This will divert the frame F down the output conveyance path 910. In embodiments, the sensors can determine the particular frames that need to be diverted using the sorting methodologies as discussed in the instant application. At this time, the pin 914 is guided through the angled groove 930, and the projection 912 engages the upper lead screw 902a of the conveyance path 910 to complete the diversion of the frame F.

In this regard and as shown in FIGS. 2M and 2N, the rotating cam 920 includes a front wall 922 and an outwardly tapered back wall 924 which defines the channel 926. As noted above, the channel 926 accommodates pins 914 either bypassing the conveyance path 910 or being diverted to the conveyance path 910. The front wall 922 is generally flat such that it is parallel to the support member 902b when in the bypass setting. The tapered back wall 924 is angled at a receiving end of the channel 926 (i.e., the point of cam rotation). The tapered back wall 924 may be angled, for example, at 22 degrees, so that in the divert setting it allows pins 914 to continually be fed into the angled groove 930 and hence towards the conveyance path 910. This will eliminate the need for the rotating cam 920 to be switched back and forth even though successive, adjacent, frames F are to be diverted to the same conveyance path. Thus, many successive frames F can be efficiently diverted into the angled groove 930 and hence to a right angle transport lane, e.g., conveyance path 910, by only turning the rotating cam 920 one time. In other words, the tapered back wall 924 allows the rotating cam divert mechanism 906 to quickly divert frames F, while reducing wear on components and minimizing pin pushing. In embodiments, the rotating cam 920 will rotate about 22 degrees, in the divert setting such that the tapered back wall 924 will be flush or substantially flush with a surface of the frame, e.g., does not extend beyond the support member 902b, in the divert setting.

Pinch Belt Divert Mechanism and Tooth Belt Conveyances

In embodiments, diverts in a tooth belt conveyance system may be accomplished by a pinch belt divert mechanism. To this end, FIG. 2O shows perspective view of a pinch belt divert mechanism in accordance with aspects of the invention. FIG. 2P shows an exploded view of FIG. 2O showing lift mechanisms in accordance with aspects of the invention.

Referring to FIGS. 2O and 2P, a non-limiting example of a tooth belt conveyance system 932 includes an input conveyance path 934 and an intersecting output conveyance path 936. The tooth belt conveyance system 932 includes a plurality of teeth 938 at spaced intervals extending along at least two outer sides 940 of the conveyance path such that frames F are supported at upper edge ends by the teeth 938. The frames F include projections 944 at lower surfaces of the upper edge ends so as to engage spaces in between the teeth 936, and thus allow the frames F to be suspended (i.e., to hang) as they are transported along the conveyance path. The frames F also include upward projecting pins 946 provided at a center portion of a top end of the frame F for use during a diversion.

The tooth belt conveyance system 932 further includes a pinch belt conveyance system 948 provided for diversion of the frames F to conveyance path 936. The pinch belt conveyance system 948 is provided at the intersection of the conveyance systems 934, 936. In embodiments, the pinch belt conveyance system 948 is positioned above the input and output conveyance systems 934, 936 to provide clearance for frames F (and upward projecting pins 946). This also prevents interference during a bypass operation (i.e., when the frames F are not diverted to the output conveyance path 936). The pinch belt conveyance system 948 includes at least two parallel horizontal belts 950 continuously running in a loop. The horizontal belts 950 provide a guide path 952 therebetween such that the upward projecting pins 946 may be engaged between the two horizontal belts 950. In engagement, the horizontal belts 950 carry the frames F from the input conveyance path 934 down the output conveyance path 936.

Lifting mechanisms 954 having vertically disposed belts 956 are provided along the tooth belt conveyance system 932. The vertically disposed belts 956 include horizontal indexes 958. At the point of diversion, the lifting mechanisms 952 may engage the frames F and push them upward (disengaging the frames F from the input conveyance path 936). That is, the horizontal indexes 958 engage upper edge ends of the frames F and push the upward projecting pins 946 into the pinch belt conveyance system 948. In this regard, the upward projecting pins 946 are securely inserted into the guide path 952 between the horizontal belts 950. The horizontal belts 950 may then carry the diverted frames F to the conveyance path 936, from conveyance path 934.

The horizontal belts 950 may also carry the diverted frames F until they clear the input conveyance path 934. More particularly, after the frames F clear the input conveyance path 936, the frames F may be placed on another tooth belt conveyance system until diversion or other action is required. It is contemplated that several different belts in series may be provided along the tooth belt conveyance system 932 such that frame F may be compressed or decompressed for more efficient sorting and sequencing of the mail pieces.

In operation, the frames F (suspended by the projections 944 at either side of the upper edge ends of the frames F along the tooth belt conveyance system 932) are driven down the input conveyance path 934. At the point of diversion (intersection of the input and output paths), a timing sensor detects the approaching frames F to determine whether or not the at least two lifting mechanisms 954 are activated for diverting a given frame F. During a diversion, the frames F are vertically lifted such that the upward projecting pin 946 becomes wedged between the two horizontal belts 950. The horizontal belts 950 divert the frames F from the input conveyance path 934 by capturing the pin 946 in the guide path 952. As this happens, the frame F disconnects from the teeth 938 of the input conveyance path 934 and the trailing edge of the frame F becomes a new leading edge of the frame F. The new leading edge of the frame F may engage a guide channel (not shown) to keep the frame on track. At an end of the pinch belt conveyance system 948, the leading edge of the frame F (more specifically at the projection 944) engages teeth on another tooth belt conveyance path and the tooth belt conveyance path drives the leading edge of the frame F down the output conveyance path 936. As the frame F begins to engage the other tooth belt conveyance system, the upward projecting pin 946 disengages the pinch belt conveyance system 948 allowing the new tooth belt conveyance system to continue the progress of the frame F through the module 900.

Vertical Divert Mechanism

In embodiments, diverts may also be accomplished with a vertical divert mechanism. Specifically, referring to FIG. 2Q-FIG. 2T vertical diverts may be implemented, e.g., when facility space is limited. The vertical divert mechanism allows selected frames F to vertically divert and serves as a bridge to guide bypassing frames F (i.e., frames not diverted) across a gap 962 at an intersection of an input conveyance path 964 and an output conveyance path 966 (i.e., a point of diversion). The conveyance paths 964, 966 move the frames F via timing belts 968. The timing belts 968 engage the frames F by pins 970 extending at upper edge ends of the frames F and move the frames F along the conveyance path. The pins 970 support the weight of the frames F.

In embodiments and as shown in FIGS. 2Q and 2R, a slotted cam 971 is provided at the point of diversion. FIG. 2Q shows the vertical divert mechanism in a bypass setting (i.e., the frame F is not diverted). Here, the pin 970 of the approaching frame F passes through a slot 972 in the slotted cam 971. In a divert setting (shown in FIG. 2R), the slotted cam 971 rotates so as to direct the pin 970 (and the frame F) down the diverted output conveyance path 966. In operation, as the frame F approaches the slotted cam 971, a sensor detects the frame such that system controls and frame tracking software indicate whether the frame F should be diverted or not. If the frame F is to be diverted, the slotted cam 971 will actuate (i.e., rotate) so as to allow the frame F to engage the vertical timing belts 968. If consecutive frames F are to be diverted, the slotted cam 971 will remain actuated open until such time a frame F is detected that should travel across the gap 962 and remain on the input conveyance path 964. An advantage of this cam-style actuation is that fewer actuations will be needed for a batch of frames F that need to travel in any given direction. The mechanism only needs to actuate open or closed once for a large batch of frames F to pass either along the input conveyance path 964 or down the output conveyance path 966 instead of having to continually rotate for each individual frame 960.

The vertical divert mechanism also includes a guide 973 to bridge the gap for the frames F bypassing the divert from the slotted cam 971. The guide 973 can be integral to the vertical divert mechanism itself, or a separate boom that extends from the slotted cam 971 to the next area of horizontal support.

In embodiments and as shown in FIG. 2S and FIG. 2T, the vertical divert mechanism may alternatively include a latch or gate 974 (pivotally attached to guide 973) that is actuated to divert the frames F down a vertical descent (or up a vertical ascent) of the diverted timing belt 968. In a bypass setting (as shown in FIG. 2S), the gate 974 is closed and the frames F travel across a top end of the gate 974 past the guide 973 to continue along the input conveyance path 964. In a divert setting (as shown in FIG. 2T), the gate 974 is open such that the frame F is directly transferred from the input conveyance path timing belt 968 to the output conveyance path timing belt 968.

In embodiments, gravity assists in pulling the frames F downward; however indexes may be used if necessary to maintain separation or orientation of the frames. Using gravity to propel frames reduces complexity of the vertical divert mechanism (e.g., reduces the dependency on motors, belts, pulleys, chains, rollers, etc.). Frames may also simply slide on rails to their next destination. At the bottom of the timing belt 968, frames F may be gated for merging into a subsequent conveyance path, which may travel in any direction.

Rotatable Slotted Cam Device

In yet another embodiment, diverts may be accomplished in a roller conveyance system. Referring to FIG. 2U, the roller conveyance system 976 includes adjacent threaded rollers 980 that transport frames F along an input conveyance path 978 and selectively divert the frames F to a diverted path or output conveyance path 979 that intersects input conveyance path 978. The frames are oriented at 45 degrees to both paths 978, 979 as they are carried along the plurality of adjacent threaded rollers 980.

In embodiments, the frames have horizontal tabs 981 at top corners thereof. The bottoms of these tabs are "knife-edged." The tabs 981 hang from tops of the threaded rollers 980. Thus, the weight of the frames F is carried by the threaded rollers 980, and the frames F can be moved and positioned by controlled rotation of the threaded rollers 980. The frames F also include vertical pins 982 in at least the upper edge end of the trailing edge of the frame F. The vertical pin 982 controls whether the frame F travels down the input conveyance path 978 or the output conveyance path 979. In this regard, the pin 982 passes through a rotatable slotted cam device 983, similar to that described with respect to the rotating cam divert mechanism 906 discussed above. However, the rotatable slotted cam device 983 is positioned above a support member and the pin 982 passes through a lower portion of the slotted cam. The present invention contemplates either orientation for both embodiments.

The rotatable slotted cam device 983 rotates to engage and direct the pin 982 (and the frame F) either along the input conveyance path 978 or down the output conveyance path 979. If the pin 982 is diverted to the output conveyance path 979, e.g., by turning the slotted cam device 983 towards the output conveyance path 979, the frame F will travel around a smooth, e.g., 90 degree curve and be diverted to the output conveyance path 979 (this is similar to the concept of providing an angled groove as discussed with regard to the rotating cam divert mechanism). In this manner, a single stream of frames F may be smoothly separated into a diverted stream and the original stream, with both streams moving at constant speed.

45 Degree Divert Mechanism

Diverts in a tooth belt conveyance system (as discussed above) may also be accomplished with a 45 degree divert mechanism. Referring to FIG. 2V, the 45 degree divert mechanism 984 provides a tooth belt conveyance system 932a, a pinch belt conveyance system 948, and a slotted flat drive belt conveyance system 932a. The conveyance systems are provided above a top plate to transport the frames "F, which are provided below the top plate. In this regard, the operation of the 45 degree divert will be described. The frames F have movable pins 944a at upper edge ends thereof and a center pin 946a provided at a center top end. The movable pins 944a and the center pin 946a are engaged in the tooth belt conveyance system 932a, i.e., the input conveyance path. The movable pins 944a are in a home position (positioned downward) while traveling along the tooth belt conveyance system 932a.

The frames F approach a point of diversion, and the movable pins 944a activate up (from the home position) so as to engage slotted flat drive belts (at 932a) to drive the frames into a 45 degree divert. Simultaneously, the center pin 946a is engaged to the pinch belt conveyance system 948 which also pulls the frame F at a 45 degree angle away from the initial tooth belt conveyance path (at 932a).

At an approximate midway point of the 45 degree divert (also termed the "transition area") one of the slotted flat drive belts 932a will disengage one of the movable pins 944a of the frame F, which will drop down and return to the home position on the frame F so as not to interfere with movement of the frame F along the divert path. That is, at the transition area the frame F is driven via two contact points, the center pin 946a (engaged with the pinch belt conveyance system 948) and the other movable pin 944a (engaged to the slotted flat drive belt 932a). At an end of the transition area, the frame F engages a center top drive belt 948a to further transition the frame F onto another tooth belt conveyance path (not shown) for continued movement through the mail sorting and sequencing system.

Compression Zones

In the course of conveying millions of mail pieces through the conveyance systems of a mail sorting and sequencing system, it is oftentimes necessary to be able to adjust gaps between the frames that carry the mail pieces. Reasons for adjusting the gap between frames may include, but are not limited to, reducing the required amount of conveyance space being used, machine availability, facility space restrictions, machine efficiency, or utilization of storage space. Additionally, it is contemplated that adjusting the gaps may also aid in more efficiently and reliably merging various conveyance paths, or aid in positioning the frames in such a way as to match work station spacing.

Adjusting the gaps may be defined as compressing the gaps or decompressing the gaps. Compressing of the gaps includes reducing the spacing between frames traveling through the conveyance system. Decompressing of the gaps includes adjusting the frames to provide additional spacing between frames. Compressing and decompressing may be done independently, or simultaneously, depending on the desired throughput configuration of the frames through the conveyance system.

It is further contemplated that adjusting gaps between frames in a conveyance system can be accomplished using a compression zone. The compression zone may be provided at a segregated section of the conveyance path, and includes an independent drive system. The compression zone, while it may include similar conveying structures as the conveyance system leading to it, may alternatively include different structures to accomplish the task of adjusting the gaps. The compression zone may include, but is certainly not limited to, belts, power rollers, wheels, ball screws, lead screws, linear motors or even robotic arms to adjust the gaps between frames.

Sensors at the compression zone monitor the flow of frames approaching from the conveyance path and the compression zone is configured to receive the frames such that subsequent approaching frames can be held back, slowed down, backed up, or sped up as needed for purposes of spacing the frames to be transitioned to additional locations in the mail sorting and sequencing system. The output result of the frames that are sent through the compression zone may include, but is not limited to, frames that are evenly spaced, frames that contact one another, frames grouped by quantity or characteristic (e.g., thickness, state, city, ZIP code, street, dimension), or gapped in any specific desired configuration for transitioning to other locations throughout the mail sorting and/or sequencing system.

The compression zone operates efficiently such that it does not slow down the overall mail system for sorting, transporting and conveying mail pieces. In embodiments, the mail sorting and/or sequencing system may process five million mail pieces in a twenty four hour period, compared to current systems in operation that process approximately one million mail pieces in a given 24 hour period. It is also contemplated that even without a compression zone, the present mail sorting and/or sequencing system including the main conveyance paths are capable of conveying up to 80,000 mail pieces per hour, double the current handling ability of existing conveyance systems. To accomplish this end, the compression zone works fluidly, integrally, and reliably with main conveyance paths leading to the compression zone such that frames (and mail pieces) are conveyed to their appropriate destinations within a specified time period.

Inset Compression Screws

FIG. 2W shows a perspective view of a non-limiting example of an inset compression zone in accordance with aspects of the invention. FIG. 2X shows a top view of the outset compression zone of FIG. 2W in accordance with aspects of the invention. In embodiments, a compression zone 985 is positioned within, e.g., a four lead screw conveyance system as shown in FIG. 2W and FIG. 2X. However, it is contemplated that the compression zone may be integral with a variety of alternative conveying systems such as, but not limited to, a pulley belt system, chain driven system, and a tooth belt system.

In the embodiment of FIG. 2W and FIG. 2X, the compression zone includes a set of at least four compression screws 986 (two provided at a lower portion of the conveyance path and two provided at an upper portion of the conveyance path) inset from main conveyance lead screws 987. That is, the compression screws 986 are positioned between the main conveyance lead screws 987 in a parallel relationship along the length of the main conveyance path. The lead screws 987 and compression screws 986 also rotate parallel to each other.

At a point of compression, compression screws 986 engaging the leading edge of the frames F are positioned parallel to the main conveyance lead screws 987 such that an end portion of the main conveyance lead screws 987 extends along side receiving ends of the compression screws 986. This provides a smooth transition between the lead screws 987 and the compression screws 986. Compression screws 986 engaging the trailing ends of the frames F are positioned such that a gap is created between the end portion of the main conveyance lead screws 987 and the receiving end of the compression screws 986. This ensures that the lead screws 987 do not interfere with the compression operation. Additionally, the compression screws 986 are offset from each other to accommodate approaching frames F angled at 45 degree to the direction of the conveyance path.

The lead screws 987 and the compression screws 986 are positioned along parallel lead screw drive shafts 989 and compression drive shafts 990, respectively. Because the compression zone 985 is provided at a segregated section of the conveyance path, break points 992 separate the lead screws 987 from the compression screws 986. At the break points 992, no lead screw portion is provided along the lead screw drive shaft 989. Instead, only the lead screw drive shaft 989 continues to extend along the conveyance path such that the lead screws 987 do not interfere with the frames F making the transition between the lead screws 987 and the compression screws 986 during a compression operation.

The lead screws 987 and the compression screws 986 are supported at a lower surface thereof by a plurality of roller cam brackets 993. The roller cam brackets 993 maintain the lead screws and compression screws level with a floor surface. In an alternative embodiment, these roller cam brackets may also provide the driving force to rotate the compression screws 986 and the lead screws 987.

The lead screw drive shafts 989 are driven by a single motor 994 and may include at least one, one-to-one right angle gear box 995 to provide uniform synchronized rotation of the lead screws 987 during operation based upon the output of the motor 994. The right angle gear box 995 is provided so as not to limit the configuration of the system, and may be utilized in an unlimited number of possible configurations for the motor 994, drive shafts 989, and lead screws 987 depending on spacing constraints, etc. In embodiments, the compression screw drive shafts 990 are driven by an independent motor 996 and also include one-to-one right angle gear boxes 997 for at least the same reasons as provided for above in the description of the lead screw drive shafts 989. The motor 994 rotating the lead screw shafts 989 may be set to operate at about 110 rpm and tolerances allow for about a 10% variance in performance.

The compression screws 986 of the compression zone 985 adjust gaps between frames being sorted/sequenced through the mail sorting and sequencing system. In this regard, the compression screws 986 can either compress the gaps between a predetermined number of frames F having varying or uniform thickness, or decompress the gaps, and create larger gaps between adjacent frames F. It is contemplated that the lead screws 987 have the capability of compressing from about 11 frames a second (i.e. about 2 inches a second) up to about 22 frames a second (i.e., about 4 inches of mail a second). To achieve this end, the compression screw threads are preferably designed having a pitch range (distance between frames F on the compression screws 986) from about 0.177 inches to about 0.25 inches in the direction of the rotation. Tolerances for the pitch characteristic of the compression screws 986 allow for about a 10% acceptable variance range.

The compression screws 986 also easily and readily accept frames F from the lead screws 987. In this regard, it is contemplated that the compression screws 986 are beveled at 60 degrees at ends interfacing with ends of the lead screws 987 (i.e., at the break point 992). The bevel allows frames F to easily transition from the lead screws 987 to the compression screws 986 (and vice versa) without interrupting the flow or speed of approaching or departing frames F.

In operation, the frames F are transported along the lead screws 987 at a 45 degree angle. As the frames F approach the compression zone 985, a sensor monitors and detects the position of individual frames F (and information logged in the control unit about the individual piece of mail attached thereto, e.g. thickness) on the lead screws 987. The sensor communicates with the compression screw motor 996 to begin rotation of the compression screws 986 such that the entire frame 988 (including the mail piece) is positioned in the compression zone 985. Once the frame 988 is securely positioned on the compression screws 986 at the desired position, the compression screw motor 996 is shut-off and rotation of the compression screws 986 stop. The frame 988 is suspended from movement along the conveyance path. The sensors continue to monitor the lead screws 987 for new approaching frames F containing mail pieces. When a new frame 988 reaches the compression zone 985, the sensors communicate with the compression screw motor 996 such that additional frames F are either compressed or spaced according to a predetermined configuration with the frame already provided in the compression zone 985. When a predetermined number of frames F are compressed or spaced, the compression screws 986 rotate until the compressed/spaced load is transitioned back online to the lead screws 987 to continue through the conveyance system. The sensors used for compressing may include, but are not limited to, laser sensors, optical sensors, diffuse lasers, magnetic proximity sensors, or encoders.

Outlying Compression Screws

In embodiments, the compression screws 986 may be positioned along the conveyance path outside the lead screws 987 in the parallel relationship similar to that discussed above with respect to the inset compression screws. That is, the lead screws 987 are positioned between the compression screws 986. The lead screws 987 and the compression screws 986 rotate parallel to each other such that the frames F of individualized mail pieces can be transported along the same for purposes of compression or decompression, and for continued efficient conveyance through the mail sorting and sequencing system.

Inline Compression Screws

Figure 2Y:
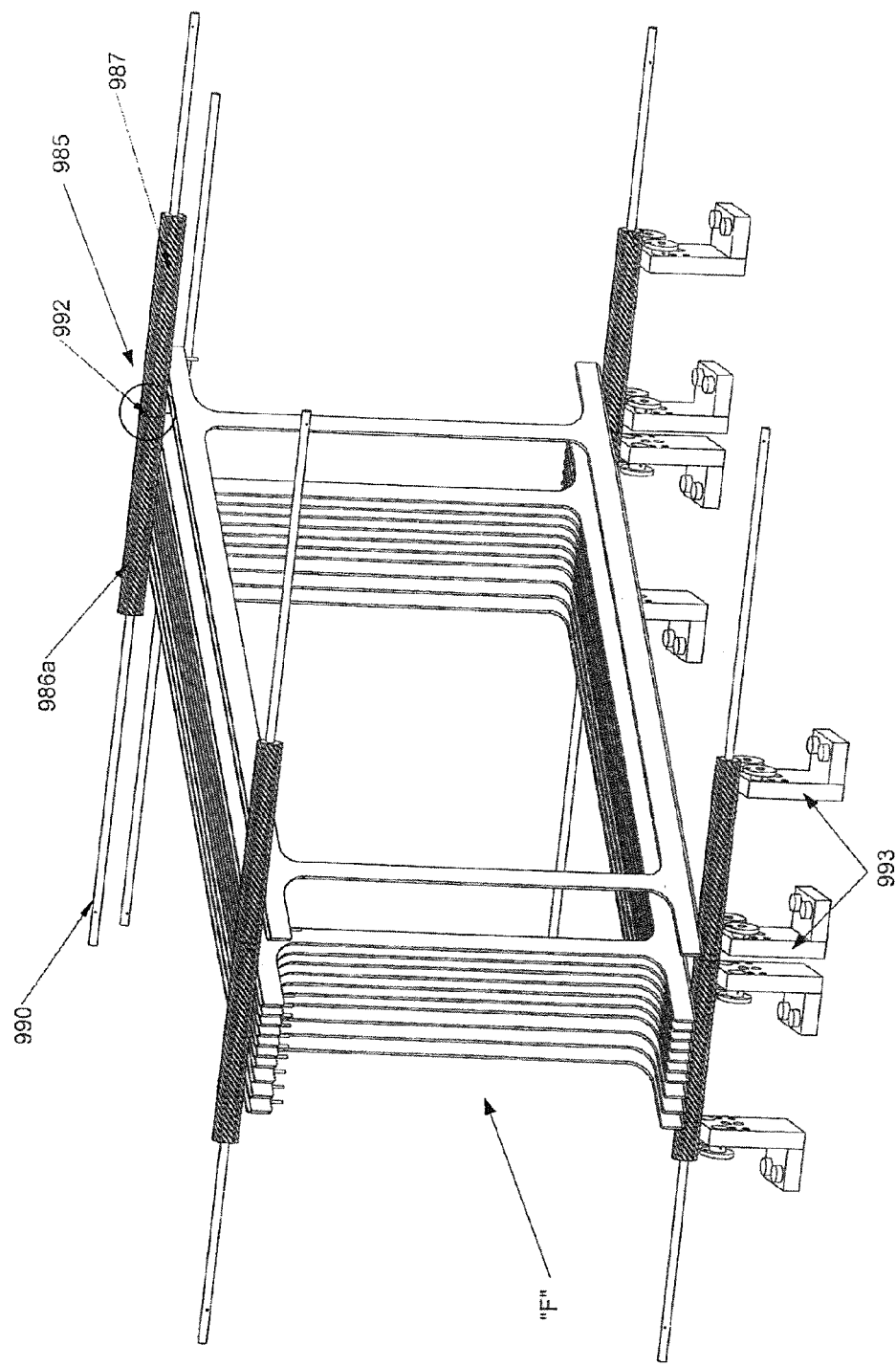
Figure 2Z:
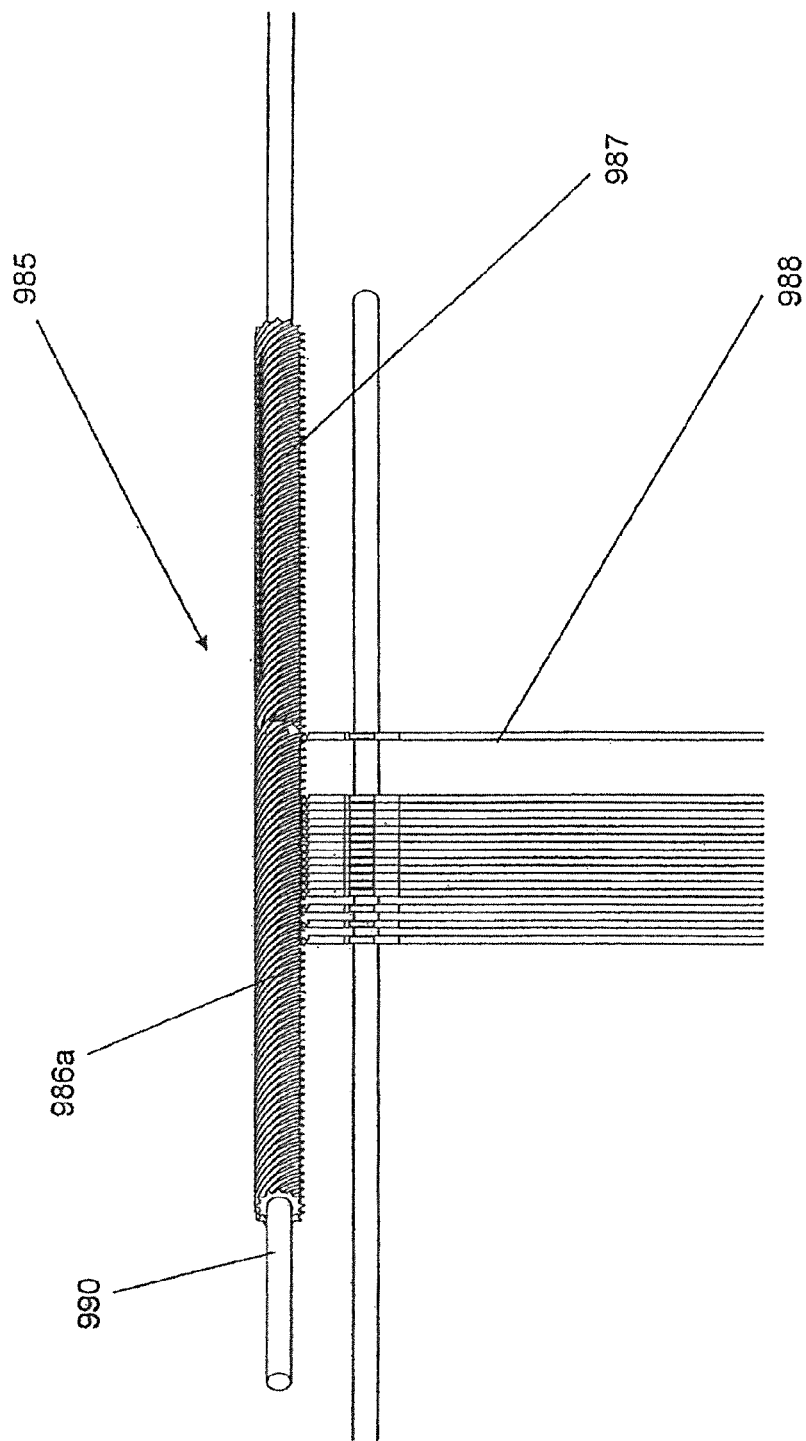

FIG. 2Y shows a perspective view of a non-limiting example of an inline compression zone in accordance with aspects of the invention. FIG. 2Z shows an exploded top view of the inline compression zone of FIG. 2Y.

As shown in FIGS. 2Y and 2Z, in embodiments, the compression zone 985 is in-line with the lead screws 987. In-line compression screws 986a are provided along the same path (as opposed to a parallel path) with lead screws 987. More particularly, at the break point 992 of the lead screws 987 where the compression zone 985 initiates operation, the compression screws 986a and lead screws 987 extend along the same horizontal axis.

In embodiments, the lead screws 987 are hollow outer casings having a thread profile at an outer surface. The hollow outer casing also serves as the drive shaft for rotation of the lead screws 987. An inner surface of the hollow casing includes a plurality of ball bearings (or alternatively spur gears) to support compression drive shafts 990 extending from the compressions screws 986a through the inner surface of the lead screws 987. An independent servo motor (as discussed above) drives the hollow casing. The ball bearings also allow the lead screws 987 to rotate independently of the compression screws 986a which are rotated by the compression drive shafts 990 driven from another independent motor (not shown). Thus, the compression screws 986a rotate at a different rate than the lead screws 987 along the same axis to aid in compressing or decompressing frames F depending on the desired operation.

The ends of the lead screws 987 leading to the break point before the point of compression cooperate with a cutback thread mechanism located on the compression screws 986a at the break point 992. The cutback thread mechanism includes an end thread design configured such that every other thread is machined back. That is, the cutback thread mechanism includes a full thread, followed by a cut back thread, followed by a full thread, etc. The full thread engages the frames F from the ends of the lead screws 987. Thus, the compression screws 986a may accept a frame F from the lead screws 987 to increase the spaced intervals between frames F or to reduce spaced intervals between frames. The spacing created is dependent on the competing rotation speeds of the screws 986a, 987, respectively.

It is noted that the last thread of the lead screws 987 may be beveled at, e.g., 60 degrees. The bevel profile does not impede the cutback thread mechanism as it accepts frames from the lead screws 987 at the break point 992.

The lead screws 987 and the compression screws are supported by roller cam brackets 993. The roller cam bracket may also be a mesh profile gear that mates the screw threads with the gear teeth such that the gear teeth drive the screws. In embodiments, the roller cam brackets may function as the independent servo motors to start and stop the rotation of the screws based on input received from the sensors at the break point 992 of the lead screws 987 for the approaching frame F.

Thus, the present invention provides a conveyance system for efficiently and reliably transporting a high volume of individual frames carrying mail pieces through a sorting and sequencing system using a variety of conveyance mechanisms. The conveyance mechanisms may include divert mechanisms and compression zone mechanisms to deliver frames from one conveyance path to another without compromising speed of the conveyance path and enhancing the efficiency of the sorting and sequencing system.

Extraction of Mail Pieces from Individually Containerized Mail Pieces

The present invention relates to extraction of mail pieces, such as letters and flats, from individually containerized frames, particularly with regard to such mail pieces being part of a facility-wide automated mail processing system. In addition to mail pieces, the invention encompasses the transportation and processing of other articles, such as, but not limited to, sheets of paper, metal, wood, plastics, etc., as well as CD's, DVD's, and/or their jewel cases, books, photographs, etc. More specifically, the present invention is directed to the extraction of individual mail pieces, such as letters, flats and small parcels, from their individualized frames, particularly with regard to such mail pieces being part of a facility-wide automated mail processing system.

Described elsewhere herein are various types of mail extraction methods and apparatus which generally rely upon a force initiated adjacent, but outside the processing stream of frames and mail pieces. As described in greater detail below, mail piece extraction can alternatively be accomplished by an apparatus, in the form of so-called "extractor frames," which move along the processing stream itself and which act upon the individually containerized mail pieces via right-angle-diverts (RADS).

As a brief summary before describing details and particular embodiments of the extractor-frame extraction of mail pieces, a facility-wide mail processing system according to the invention relates to individualized frames for mail pieces, such as letters and flats, for use in moving such mail pieces in a facility-wide mail sorting and/or sequencing system. Such frames are herein referred to as a "frame," a "folder," or a "frame/folder." Each frame is constructed for the purpose of containing a single mail piece as the mail piece is sorted and sequenced with other such containerized mail pieces, or as they are stored for subsequent processing. Each mail piece is inserted into a frame when inducted into the system, and extracted from its frame during preparation for dispatch.

Within a given system, frames of different types can be utilized to accommodate letters and flats, e.g., which can vary in size and shape. However, the frames within a system have a standard shape-factor, which makes automated handling easier; although different shapes are also contemplated by the present invention.

A frame, occasionally referred to as a "frame/folder," includes (1) a frame portion that is transported along a processing path by a driving mechanism, such as lead screws, e.g., which driving mechanism drives a plurality of successive frames within the mail processing system, and (2) a folder portion having at least one portion movably connected to the frame portion, the folder portion having at least a portion movable or deformable relative to the frame between a first position for facilitating selective insertion and extraction of a single mail piece within the container, and a second position, wherein the folder portion is empty of any mail piece.

According to a particular aspect, the engageable portions of the frame are positioned to orient the frame during travel within the mail processing system other than in a direction along the length of the frame. In this manner, a stack of successive frames occupies a minimal length along the travel direction relative to known systems. More particularly according to that aspect of the invention, the aforementioned orientation of the frame is an angle of 45° with respect to the direction of travel.

According to various embodiments according to the invention, in the first position of the folder, insertion and extraction of the mail piece is facilitated. In the second position of the folder, no mail piece is contained in the folder and the folder has a minimized width. In embodiments, the folder can additionally include other positions such as, for example, an intermediate or partially open state to accommodate different sizes of mail pieces.

The frame part of the frame/folder, or "frame," is rigid, whereas the movable portion of the folder is movable/deformable away from the rigid frame to the first position. The frame is generally rectangular. In the particular embodiments described below, extraction of mail pieces is accomplished through a side opening of the frame.

Mail pieces in frames are sorted and sequenced using Right Angle Diverts (RADs), merges, compression zones, decompression zones, and shuttles. RADs split a stream of frames into two streams, moving at an equal speed, by diverting individual frames. Because of the 45° orientation of the frames, RADs can divert frames without stopping either stream by sliding frames out from between adjacent frames. This results in a sliding or shearing relative motion between adjacent frames.

Merges, or merge areas, merge two streams of frames into a single stream. Again, because of the 45° orientation, such merging is accomplished without requiring the streams to stop. A merge also results in a sliding or shearing movement between adjacent frames.

Compression zones remove gaps from between frames within a stream. Decompression zones insert gaps between frames within a stream. When individual handling of frames is not required, frames are moved as batches contained in shuttles. After mail pieces have been sorted and sequenced, they are extracted from the frames and inserted into trays for delivery.

As described elsewhere herein, mail pieces are individually contained in a frame/folder, generally referred to as a "frame," as the mail pieces are sorted, sequenced, and otherwise processed in the mail processing system. While it may be possible to leave the mail pieces in their respective frames for delivery to the customer, the additional weight and package size, in addition to potential waste/recycling cost or reuse of the individual frame would be generally prohibitive. Therefore, the better approach is to utilize the individual containers, or frames, for sorting and transport within the mail processing system and to remove the mail pieces from their frames prior to placement into a delivery container.

The present invention, therefore, relates to the removal, or extraction, of flat articles from the individual frames for placement into delivery containers. The invention is applicable to any system that transports flat or mail piece-like articles, including single or multi-sheet documents in individual frames, and requires the removal of such articles from their individually containerized containers, or frames, prior to further processing internally within the system, or externally thereof.

Mail Frames

The present invention relates to individualized frames for mail pieces, such as letters and flats, for use in moving such mail pieces in a facility-wide mail processing system. Such frames are herein referred to as a "frame," a "folder," or a "frame/folder." Each frame is constructed for the purpose of containing a single mail piece as the mail piece is sorted and sequenced with other such containerized mail pieces, or as they are stored for subsequent processing. Each mail piece is placed/inserted into a frame when inducted into the system, and removed/extracted from its frame during preparation for dispatch.

It is beneficial to be able to singulate, divert, sort, and sequence mail in the same format orientation that the mail is conveyed. Without this capability, the orientation of the mail may need to be changed or the mail piece stack may need to be "opened up" to perform mail operations. Since mail comes in all shapes and sizes, a reliable way to handle mail in a stack is to temporarily attach or encase each mail piece (e.g., letter, flat or parcel) to a frame to maintain singulation and facilitate the conveying and sorting of mail in a stack. This frame could be an individual mail piece container that follows the mail piece around through many processes (possibly even through transportation) or an individual clamp or clasp (as discussed in another section herein). The handling mail packaged in separate frames in a stack has the following advantages.

Every packaged mail piece has the same dimensions, e.g., the same form factor, regardless of the size of mail. The form factor is also optimized to ensure that mail of many sizes can be efficiently stored therein. Therefore, the frame provides the sortation/conveying equipment the same form factor thus preventing jams and providing other advantages as discussed herein.

Mail pieces can be conveyed in a stack (less speed and greater throughput with fewer jams).

Mail pieces can be sorted, filtered, and diverted efficiently, e.g., allows control of one mail piece in a stack.

The frames maintain mail piece singulation, position and identification and provides protection for the mail pieces.

Within a given system, frames of different types can be utilized to accommodate letters and flats, e.g., which can vary in size and shape. However, the frames within a system have a standard shape-factor, which makes automated handling easier; although different shapes are also contemplated by the present as discussed in the instant application. A frame can be considered as a file folder. Its use as containerizing mail pieces prevents jams, eliminates mail damage, and maintains a reduced sorting speed vis-à-vis conventional systems which transport mail pieces along their lengths. According to a particular embodiment, frames can be vacuum-packed to detect/contain/minimize biohazards. Each frame has a unique identifier, i.e., an ID, such as a bar code, that is physically located on the frame.

To these and other ends, the invention relates to a mail piece frame adapted to maintain a single mail piece in a mail processing system, the frame including (1) a frame portion that includes at least a pair of portions adapted to be engaged by a driving mechanism, e.g., lead screws, belts, etc. for transporting a plurality of successive frames within the mail processing system, and (2) a folder portion having at least one portion movably connected to the frame portion, the folder portion having at least a portion movable relative to the frame between a first position for facilitating selective insertion and extraction of a single mail piece within the container, and a second position, wherein the folder portion is empty of any mail piece.

According to a particular aspect, the engageable portions of the frame are positioned to orient the frame during travel within the mail processing system other than in a direction along the length of the frame. In this manner, a stack of successive containers occupies a minimal length along the travel direction relative to known systems. More particularly according to that aspect of the invention, the aforementioned orientation of the frame is an angle of 45° with respect to the direction of travel.

According to various embodiments according to the invention, in the first position of the folder, insertion and extraction of the mail piece is facilitated. In the second position of the folder, no mail piece is contained in the folder and the folder has a minimized width.

According to another aspect of a mail container according to the invention, the frame is rigid and the movable portion of the folder is movable away from the rigid frame to the first position. According to a further aspect of a mail container according to the invention, the frame is generally rectangular and the folder is generally rectangular. In a particular embodiment, the movable portion of the folder portion is pivotable away from the rigid frame to contain a mail piece at a common connection between the frame and the folder.

According to another aspect, the frame includes at least one actuator tab adapted to be manipulated by a mechanism for moving the folder to the first position. According to a particular embodiment, the movable portion of the folder is slidable relative to the frame, the movable portion of the folder being maintained generally parallel to the frame during movement to the first position. According to another aspect of the invention, at least one opening is maintained between the frame and the folder for insertion and extraction of a mail piece relative to the frame. Such an opening is located at a top and/or at a side of the container.

The individualized frame for each piece of mail (i.e., a letter or a flat), generally referred to herein as a frame (alternatively, as a folder or a frame/folder), can take any of various forms, including those further described herein and depicted in various drawing figures. As described elsewhere herein, the system sorts and sequences such containerized mail pieces, ultimately resulting in the placement of the mail pieces into trays for delivery by a postal carrier.

As described elsewhere herein, each mail piece is inserted into a frame. The process of inserting a mail piece into a frame is called "insertion".

In a particular embodiment, in which the frame has a generally rectangular shape, the frame is conveyed via four lead screws, one positioned at each of the corners of the rectangle, as shown elsewhere herein. The lead screws turn synchronously to move the frames through the system. As mentioned above, successive frames are oriented at 45° to the direction of travel. Due to this stack orientation, the spacing between frames (center to center) can be very small. Therefore, high mail piece throughput can be achieved at low transport speeds, particularly relative to known mail transport systems, whereby the mail pieces are conveyed by pinch belts along their lengths, rather than at 45°. Although the invention encompasses transporting the frames at angles other than 45°, advantages are realized within the system, as explained elsewhere herein, with that angle.

As the thickness of the frame increases, or as spacing between frames increases, the transport speed can also be increased in order to achieve constant throughput. Furthermore, increased frame thickness requires an increased storage space. For these reasons, the thickness of individual frames should be as thin as possible.

Further, the invention encompasses a system containing multiple, e.g., millions, of frames. Therefore, in order to minimize the cost and weight of the system, the cost and weight of individual frames should be minimized. The physical dimensions of mail pieces handled by a system according to the invention can vary widely. Exemplary ranges of dimensions for letters and flats are the following:

|  | Type | Height (inches) | Length (inches) | Width (inches) | Weight |
| --- | --- | --- | --- | --- | --- |
| Maximum dimensions | Letter | 6.125 | 11.5 | 0.25 | 3.5 oz. |
|  | Flat | 12 | 15.75 | 1.25 | 6 lbs. |
| Minimum dimensions | Letter | 3.5 | 5 | 0.007 | N/A |
|  | Flat | 4 | 4 | 0.007 | N/A |

Because of this wide dimensional range of mail pieces, the system can be implemented with the simultaneous use of multiple frame designs or structures, i.e., non-identical frames. For example, the system can use frames of both a "heavy-duty" design as well as frames of a "light-weight" design. In such a scheme, all letters and some thin light flats can be transported/processed in light-weight frames, and the remaining heavy, thick flats can be transported/processed in heavy-duty frames. In addition to mail pieces, the invention encompasses the transportation and processing of other articles, such as, but not limited to, sheets of paper, metal, wood, plastics, etc., as well as CD's, DVD's, and/or their jewel cases, books, photographs, etc.

The simultaneous use of multiple frame designs has a number of advantages. For example, a heavy-duty design can be more robust, to handle the relatively larger flats. A light-weight frame could be employed only to carry small mail pieces and, therefore, it can be constructed thinner and less expensively than the heavier frame design, while still reliably performing its intended function. The relatively thin and inexpensive light-weight frame offsets the more robust and expensive heavy-duty frame, such that the average cost, size, and weight of the frames can be reduced and within limits specified by the user.

The thickness of an empty frame, i.e., one carrying no mail piece, and the distance between immediately successive threads, i.e., adjacent threads, on the lead screws can be sized such that empty frames can occupy successive threads with no gap. The thickness (e.g., front to back) of a frame containing a mail piece can be greater than that of an empty frame. According to particular embodiments, described in greater detail below, such increase in thickness can be manifested on only one side of the frame, rather than on both sides. Therefore, such increased thickness can thereby only require one successive empty thread, e.g., on the side to which the thickness expands, rather that requiring a successive empty thread on both sides of the frame.

Many alternative configurations and embodiments for the system are described herein. This includes various configurations for both insertion and extraction. In some configurations, mail pieces are inserted into the frames from the side. In other configurations, they are inserted from above. Similarly, in some configurations mail pieces are extracted from the frame from the side. In other configurations, they are extracted from the folder through the bottom.

The term "frame," as generally used herein, can be considered an abbreviated version of the term "frame/folder," the latter term implying a two-part construction that includes both a "frame" part and a "folder" part. In this context, the frame part gives the frame/folder its structural rigidity and engages the lead screws. The folder part can be generally regarded as that part of the frame/folder that captures and carries the mail piece, albeit, in certain embodiments, in conjunction with the frame part. Generally, the frame of a frame/folder is the more rigid of the two parts and the folder of a frame/folder can be generally regarded as the movable part of the two parts, such movement facilitating insertion and extraction of a mail piece with respect to the frame/folder. Movement of the folder part can be manifested as any of various forms of movement, such as pivoting movement in the form of a hinged connection, pivoting in the form of a parallelogram linkage connection, and movement by virtue of movable components within the folder. Still further, movement of the folder can be manifested by merely the deformability of the material of which the folder is composed.

All frames within a system use a similar design, or shape. In some embodiments, described in greater detail below, the frame is rectangular with tabs extending horizontally from each of four corners. A pin extends vertically from one or each of two top tabs. These pins facilitate the diverting and merging of the frames while engaged with the lead screws. The top and bottom of the frame can be knife-edged (or has a rectangular edge) in order to ensure positive engagement with the lead screws. It is contemplated that such edges might incur frictional wear due to their movement on the lead screws. Therefore, the edges can be made to be easily removable and replaceable, such that as wear occurs the edges can be replaced, rather than disposing of the entire frame.

A frame, according to particular embodiments according to the invention is approximately ⅛" thick (0.125 in.; 3.18 mm) A rectangle is cut out of the center of the frame, such that the material remaining on all four sides of the cutout is approximately 0.5-1.0 in. (12.7-25.4 mm) in width. This cutout reduces the overall weight of the frame; although other dimensions and sizes, etc. are contemplated by the present invention. It also allows the mail piece to nest inside the frame, such that the overall thickness is minimized. In some designs, the folder part also nests inside the frame part, thus further reducing the overall thickness. As an alternative to creating the frame by cutting out a rectangular center, the four sides can be constructed by welding or otherwise connecting them together at the four joints.

To ensure that the frame/folder expands in only one direction, many of the designs incorporate a piece of thin, inflexible material, attached to one side of the frame and covering the entire area of the cutout. This thin, inflexible material is referred to as a backer. In the following description, reference is made to exemplary embodiments of frames, folders, and frame/folder combinations illustrated in the various drawing figures.

Sequencing of Individually Containerized Mail Pieces Inside of a Storage Unit

45 Degrees & Right Angle Divert (RAD)

According to the system and method of the invention, each individual mail piece is placed in an individual frame that moves through a machine or group of machines. These machines and frames of mail, however, can quickly occupy floor space. To keep the frames in a dense configuration and to facilitate the diversion of mail pieces while being transported through a machine, the frames are normally kept at a 45 degree angle. This orientation allows any frame to be extracted out of or inserted into a moving stream of frames without having to change the speed of the stream. The preferred technique for diverting a frame from the stream is to use a "Right Angle Divert" (RAD) as discussed in embodiments of the instant application. In embodiments, the RAD can divert frames out of a stream in the perpendicular direction of the trailing edge with respect to its current heading.

Vertical Divert

RAD's work on the horizontal plane, but many facilities also have vertical space to occupy. To best utilize the available vertical space, there is a need to divert, move, and store mail vertically.

The use of vertical diverting solves this problem by allowing frames to travel up or down inside the embodiment of the invention, which is described in the instant application. Accordingly, diverting the mail in a vertical direction allows mail pieces to be stored in a vertical location, and vertical diverting increases the available storage locations where the mail can be sequenced.

General Concept

The sequencing of mail pieces while in storage, conserves floor space and minimizes the need for additional storage and sequencing units. Since storage takes up the most space relative to other processes in the sequencing system, the method and system of the invention utilizes vertical space for both storage and sequencing. Accordingly, the invention includes the use of a plurality of storage units which accept mail pieces including presorted mail pieces, and then sequence the mail pieces within the storage unit, which is described in the instant application. The sequenced mail pieces from each storage unit are released out to a final sequencing process that outputs from each storage unit into a final DPS order. The sequencing process preferably includes vertically recirculating mail pieces which are sequenced in either small blocks or in progressive increments. It should be understood that the term mail piece is used very broadly to include letters, flats and other objects of various different sizes.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

It is claimed:

1. A conveyance or transport system comprising:
conveyance mechanisms; and
transport frames which are transported by the conveyance mechanisms,
wherein the conveyance mechanisms are structured to transport the transport frames at a canted angle of about 45 degrees with relation to a first stream of travel and in a front-to-back orientation on a first conveyance mechanism of the conveyance mechanisms, and
the conveyance mechanisms are structured and arranged to divert selected ones of the transport frames without slowing a transport speed while maintaining the transport frames at the canted angle of about 45 degrees in a stream of travel on an adjacent conveyance mechanism of the conveyance mechanisms.

2. The conveyance or transport system of claim 1, wherein the conveyance mechanisms are at least one of lead screw mechanisms, tooth belt mechanisms, pinch belt mechanisms, individual roller mechanisms, and chain mechanisms.

3. The conveyance or transport system of claim 1, wherein:
the frames are sorted through the conveyance mechanisms with right angle diverts (RADs), merges, compression zones and decompression zones;
the RADs are structured and arranged to split a stream of the frames into different streams by diverting individual frames;
the compression zones are structured and arranged to remove gaps from between the frames within the stream of travel; and
the decompression zones are structured and arranged to insert gaps between the frames within the stream of travel.

4. The conveyance or transport system of claim 3, wherein the RADs are structured to divert individual frames without stopping either stream of the frames on separate conveyance paths by sliding them from between adjacent frames.

5. The conveyance or transport system of claim 3, wherein the RADs are structured to merge two streams of the frames into a single stream without stoppage of the two streams.

6. The conveyance or transport system of claim 3, wherein the RADs are a multiplexer located between sections of sorting and/or sequencing machines and which are arranged and structured to route the frames from one of many input conveyance paths to one of many output conveyance paths.

7. The conveyance or transport system of claim 3, wherein each of the RADs divert the frames based on a sequence number assigned to the frames, such that the frames are diverted to a transport path in a numerical order.

8. The conveyance or transport system of claim 3, wherein the RADs are configured in cascading sections of a sorting and/or sequencing system such that an output of a first stage is cascaded to a second stage.

9. The conveyance or transport system of claim 1, wherein the conveyance mechanisms comprises at least two conveyance paths, wherein the two conveyance paths intersect at an angle of 45 degrees with respect to the stream of travel of the frames.

10. The conveyance or transport system of claim 9, wherein:
a first of the conveyance paths are configured such that the frames are transported in about a 45 degree angle with respect to the stream of travel;
a second of the conveyance paths is provided that intersects with to the first conveyance path; and
the frames are reoriented onto the second conveyance path in a non-right angle orientation in the front-to-back orientation.

11. The conveyance or transport system of claim 9, wherein a first conveyance path and a second conveyance path of the at least two conveyance paths are arranged such that forward motion of a leading edge of a frame stops at a point of diversion and a trailing edge of the frame initiates diversion to the second conveyance path.

12. The conveyance or transport system of claim 1, wherein the conveyance mechanisms include a rotating cam divert mechanism to divert the frames from an input conveyance path to an output conveyance path.

13. The conveyance or transport system of claim 12, wherein:
the input conveyance path and the output conveyance path are lead screws comprising a lower portion and an upper portion;
the upper portion of the lead screws are parallel to each other in a width direction and parallel to the lower portion in a height direction as both ends extend along the length of a main conveyance path; and
threads of the lead screws have a pitch such that the frames are angled at 45 degrees to the stream of travel and are transported along the lead screws to engage divert sections and compression zones without compromising conveying speed.

14. The conveyance or transport system of claim 13, further comprising lead screw drive shafts driven by a motor to drive the lead screws, wherein at least one, one-to-one right angle gear box provides uniform synchronized rotation of the lead screws during operation in any of divert sections or compression zones.

15. The conveyance or transport system of claim 12, wherein:
the rotating cam divert mechanism includes a rotating cam for diverting the frames;
the rotating cam rotates between a bypass setting and a divert setting;

in the divert setting, the rotating cam rotates such that a pin of the frames engages a channel or slot of the rotating cam, and is diverted into an angled groove of a support member thereby directing the frames to a conveyance path; and in the bypass setting, the rotating cam blocks the pin from entering into the angled groove such that the frames continue along their original path.

16. The conveyance or transport system of claim 1, wherein the conveyance mechanisms include a tooth belt conveyance system comprising an input conveyance path and an intersecting output conveyance path, wherein the tooth belt conveyance system includes a plurality of teeth at spaced intervals extending along at least two outer sides of the conveyance path such that the frames are supported at upper edge ends by the teeth.

17. The conveyance or transport system of claim 1, further comprising lift mechanisms comprising vertically disposed belts provided along a tooth belt conveyance system, wherein the vertically disposed belts include horizontal indexes which engage upper edge ends of the frames and push upward projecting pins into the pinch belt conveyance system.

18. The conveyance or transport system of claim 1, further comprising a vertical divert mechanism which is structured to allow selected frames to vertically divert, wherein the vertical divert mechanism comprises:
    a bridge to guide bypassing frames across a gap at an intersection of an input conveyance path and an output conveyance path;
    a slotted cam which is rotatable to direct a pin of the frames entering a slot of the slotted cam to a diverted output conveyance path; and
    a latch or gate that is actuated to divert the frames down a vertical descent or up a vertical ascent of a diverted timing belt.

19. The conveyance or transport system of claim 1, further comprising a 45 degree divert mechanism comprising a tooth belt conveyance system, a pinch belt conveyance system, and slotted flat drive belts, wherein:
    the frames have movable pins at upper edge ends thereof and a center pin provided at a center top end;
    the movable pins and the center pin are engaged in the tooth belt conveyance system;
    the movable pins are in a home position while traveling along the tooth belt conveyance system;
    as a frame approaches a point of diversion, the movable pins activate up from the home position so as to engage the slotted flat drive belts to drive the frames into a 45 degree divert;
    simultaneously, the center pin is engaged to the pinch belt conveyance system which also pulls the frame at a 45 degree angle away from an initial tooth belt conveyance path;
    at a transition area of the 45 degree divert, one of the slotted flat drive belts will disengage one of the movable pins of the frame, which will drop down and return to the home position so as not to interfere with movement of the frame along the divert path; and
    at an end of the transition area, the frame engages a center top drive belt to further transition the frame onto another tooth belt conveyance path for continued.

20. The conveyance or transport system of claim 1, wherein movement of the frames along the conveyance mechanisms are controlled by a control unit which coordinates the movements of individual frames using real-time location notifications from a plurality of sensors communicating with the control unit.

21. The conveyance or transport system of claim 1, wherein the conveyance mechanisms comprise at least two conveyance paths at 90 degree angles with respect to one another, and each of the conveyance paths are structured and arranged to divert the selected ones of the transport frames to another of the conveyance paths while maintaining the transport frames being at a canted angle of about 45 degrees with relation to the stream of travel.

22. A conveyance or transport system comprising:
    conveyance mechanisms; and
    transport frames which are conveyed by the conveyance mechanisms, the transport frames being at a canted angle of about 45 degrees with relation to a stream of travel and in a front-to-back orientation, and
    wherein:
    the conveyance mechanisms are structured and arranged to divert selected ones of the transport frames without slowing a transport speed;
    the conveyance mechanisms comprise three conveyance paths;
    two of the conveyance paths are at 90 degree angle with respect to one another;
    a third of the conveyance paths is at a 45 degree angle with respect to the two conveyance paths;
    each of the conveyance paths are structured and arranged to divert selected ones of the transport frames to between one another of the conveyance paths;
    the two conveyance paths are structured and arranged to divert the selected ones of the transport frames to another of the two conveyance paths while maintaining the transport frames at a canted angle of about 45 degrees with relation to the stream of travel; and
    at least one of the two conveyance paths are structured and arranged to divert the selected ones of the transport frames to the third conveyance path such that the transport frames are reoriented at a 90 degree onto the third conveyance path in relation to the stream of travel.

* * * * *